United States Patent [19]
Pfeiffer

[11] Patent Number: 5,368,276
[45] Date of Patent: Nov. 29, 1994

[54] VALVE WITH TRUNCATED APERTURE PROVIDING ENHANCED RANGEABILITY AND LOGARITHMIC FLOW CHARACTERISTIC

[76] Inventor: Robert W. Pfeiffer, 3 Hidden Spring La., Rye, N.Y. 10580

[21] Appl. No.: 53,077

[22] Filed: Apr. 26, 1993

Related U.S. Application Data

[63] Continuation-in-part of Ser. No. 736,702, Jul. 26, 1991, Pat. No. 5,205,537, which is a continuation-in-part of Ser. No. 639,414, Jan. 10, 1991, abandoned, which is a continuation of Ser. No. 563,932, Aug. 6, 1990, which is a continuation of Ser. No. 84,635, Aug. 12, 1987, which is a continuation-in-part of Ser. No. 48,078, May 11, 1987, abandoned, which is a continuation-in-part of Ser. No. 570,171, Jan. 12, 1984, Pat. No. 4,664,139.

[51] Int. Cl.$^5$ .............................. F16K 3/26; F16K 3/32
[52] U.S. Cl. ..................................... 251/205; 251/326; 251/120; 251/368; 137/375; 137/240
[58] Field of Search ................. 137/240, 375; 251/205, 251/63, 120, 326, 327; 406/192, 195, 183; 222/561, 216, 559

[56] References Cited

U.S. PATENT DOCUMENTS

| | | |
|---|---|---|
| 1,090,807 | 3/1914 | Warthen . |
| 1,550,725 | 8/1925 | Jung . |
| 1,770,717 | 7/1930 | Stremberger . |
| 1,892,260 | 12/1932 | Wick . |
| 2,059,733 | 11/1936 | Heisser . |
| 2,631,759 | 3/1953 | Hoopes . |
| 2,903,564 | 8/1959 | Carr . |
| 3,240,466 | 3/1966 | Meyer . |
| 3,701,359 | 10/1972 | Worley et al. . |
| 3,918,471 | 11/1975 | Bedner . |
| 4,009,727 | 3/1977 | Bailey . |
| 4,174,728 | 11/1979 | Usnick et al. . |
| 4,253,487 | 3/1981 | Worley . |
| 4,257,543 | 3/1981 | Muschner et al. . |
| 4,292,991 | 10/1981 | Wing . |
| 4,292,992 | 10/1981 | Bhidé . |
| 4,331,533 | 5/1982 | Dean et al. . |
| 4,332,674 | 6/1982 | Dean et al. . |
| 4,336,160 | 6/1982 | Dean et al. . |
| 4,372,338 | 2/1983 | Efferson . |
| 4,471,942 | 9/1984 | Kocanowski . |
| 4,664,139 | 5/1987 | Pfeiffer . |

FOREIGN PATENT DOCUMENTS

| | | |
|---|---|---|
| 2388183 | 4/1977 | France . |
| 1918875 | 11/1969 | Germany . |
| 1239151 | 7/1971 | United Kingdom . |

OTHER PUBLICATIONS

DeZurik Series C Knife Gate Valves, Bulletin 31.00-1, Oct. 1977.
Section 4-Appendix-Technical Data, pp. 61-63.

Primary Examiner—Arnold Rosenthal
Attorney, Agent, or Firm—Victor E. Libert; Frederick A. Spaeth

[57] ABSTRACT

A control valve well-suited for controlling the flow of particulate solids comprises a valve body having a flow passageway comprising inlet and outlet passages extending transversely to a slide chamber. A plug member having a flow orifice is mounted for movement within the slide chamber to seal the flow passageway when the flow orifice is out of register therewith and to connect the inlet and outlet passages in flow communication when registered therewith. One of the inlet passage and the flow orifice has a cross section including a tapered slot portion which terminates in an apex defining an angle of from about 45 to 90 degrees and an associated polygonal base portion or circular arc base portion subtending from 225 to about 270 degrees of arc. The other has a peripheral shape which includes a leading edge disposed substantially perpendicular to the direction of travel of the plug member. This arrangement provides valves of enhanced rangeability with a unique logarithmic flow characteristic which, for most flow rates, is intermediate to linear and equal percentage flow characteristics.

39 Claims, 16 Drawing Sheets

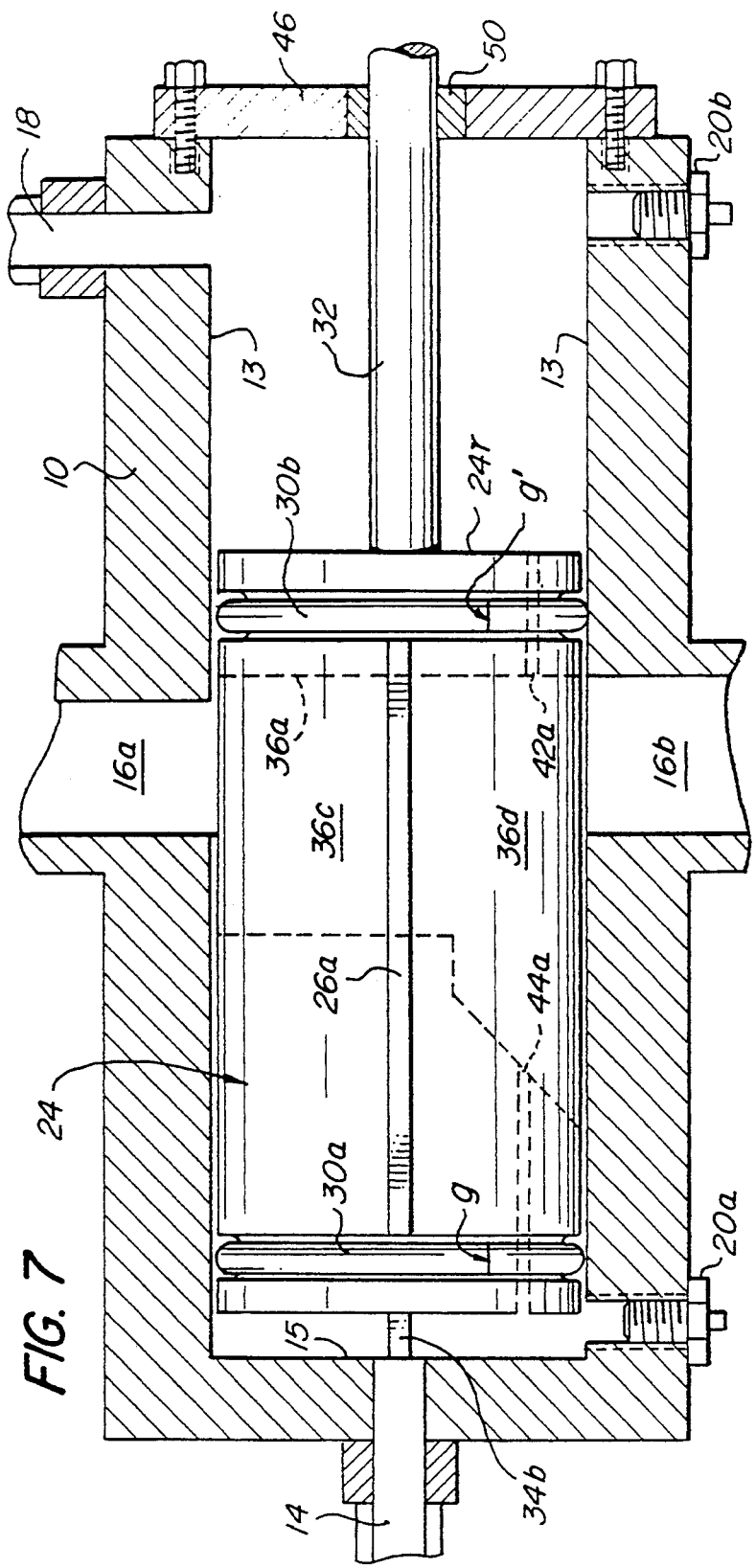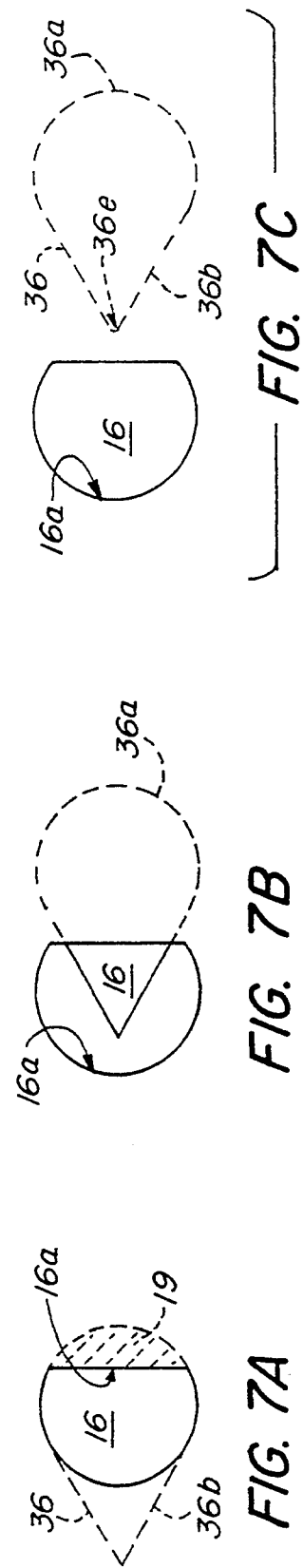

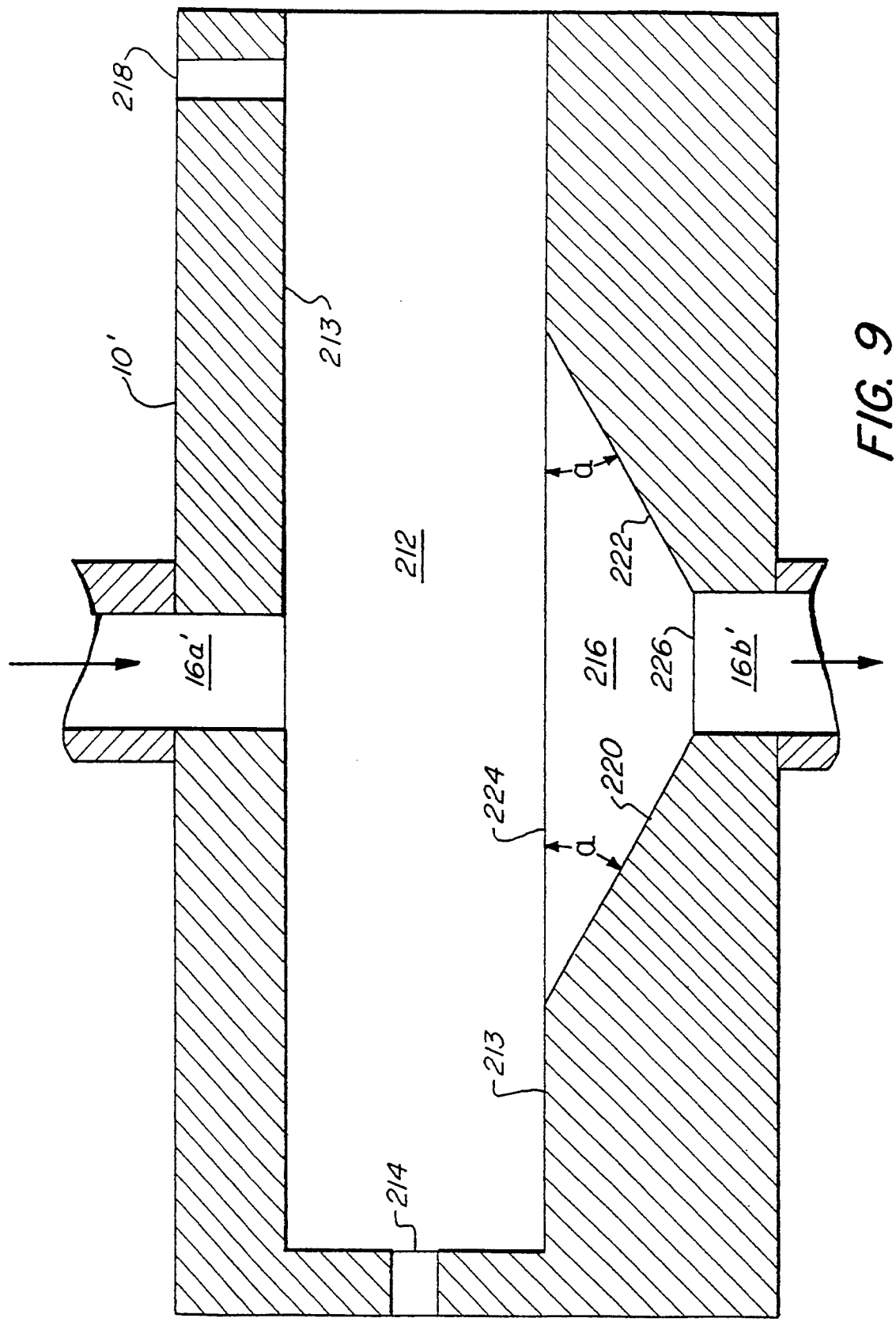

VALVE WITH TRUNCATED APERTURE PROVIDING ENHANCED RANGEABILITY AND LOGARITHMIC FLOW CHARACTERISTIC

REFERENCE TO RELATED APPLICATION

This application is a continuation-in-part of application Ser. No. 07/736,702, filed Jul. 26, 1991, now U.S. Pat. No. 5,205,537, dated Apr. 27, 1993, in the name of Robert W. Pfeiffer and entitled "VALVE WITH ENHANCED RANGEABILITY AND LOGARITHMIC FLOW CHARACTERISTIC", which is a continuation-in-part of application Ser. No. 07/639,414 filed Jan. 10, 1991, abandoned, in the name of Robert W. Pfeiffer and entitled "VALVE WITH ENHANCED RANGEABILITY AND LOGARITHMIC FLOW CHARACTERISTIC", which application was a continuation of application Ser. No. 07/563,932 filed Aug. 6, 1990, which application was a continuation of application Ser. No. 07/084,635, filed Aug. 12, 1987, which application was a continuation-in-part of application Ser. No. 07/048,078 filed May 11, 1987, abandoned, in the name of Robert W. Pfeiffer and entitled "VALVE WITH ENHANCED RANGEABILITY AND LOGARITHMIC FLOW CHARACTERISTIC", which in turn is a continuation-in-part of application Ser. No. 06/570,171 filed Jan. 12, 1984 in the name of Robert W. Pfeiffer and entitled "VALVE ESPECIALLY FOR CONTROLLING PARTICULATE SOLIDS FLOW", now U.S. Pat. No. 4,664,139.

BACKGROUND OF THE INVENTION

The present invention pertains to an improved valve and more particularly pertains to a valve having enhanced rangeability and a logarithmic flow characteristic. The valves of the invention are particularly well adapted to the valving of dry solid particulate materials having high flowing densities (for example, fluidized solids such as the fluidized catalysts flowed through dense-phase standpipes utilized in fluid catalytic cracking units), and slurries of coal or other abrasive particulate solids in liquids.

The prior art discloses valve structures specifically designed for handling fluidized solids, other solid particulates and/or slurries, and shows an awareness of the problems of flow characteristics and of wear of the component parts of such valves by the handling of abrasive solid materials.

Bulletin 31.00-1, October 1977, *DeZurik® Series C Knife Gate Valves* is a brochure published by DeZurik, a unit of General Signal, Sartell, Minn., 56377. At page 3, paragraph 12, this brochure shows a "vee-orifice valve" for throttling control of thick slurries such as paper stock.

U.S. Pat. No. 1,892,260 to Wick, dated Dec. 27, 1932, shows a pneumatic dash gun for applying a stucco finish, the gun including a storage receptacle for holding the mixture of sand, cement and water which is supplied through a valve into an air pipe for delivery through a nozzle. The valve comprises a plate containing a generally ovoid-shaped opening which is movable into and out of register with a circular cross section conduit leading from the storage receptacle.

German Offenlegungsschrift 1918875 published Nov. 6, 1969 by W. Hausammann et al also appears to disclose in FIG. 1 a valve in which a triangular port 27 is brought into and out of register with a circular orifice 17.

U.S. Pat. No. 1,550,725 to Jung dated Aug. 25, 1925, discloses a valve construction having a triangular port. (43 in FIG. 2) which aligns with a triangular shaped opening into a circular cross section orifice 31.

U.S. Pat. No. 4,471,942 to Kocanowski, dated Sep. 18, 1984 discloses a valve in which the cross-sectional flow area is defined by the coincidence of a circular aperture with a triangular apex.

SUMMARY OF THE INVENTION

The present invention provides a control valve comprising a valve body having a slide chamber therein and an inlet passage and an outlet passage cooperating to partially define a flow passageway intersecting the slide chamber. A plug member is mounted for movement within the slide chamber and has an elongated flow orifice extending transversely therethrough, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith. A positioning means is operatively connected to the plug member to position the plug member at selected locations within the slide chamber to selectively adjust registration of the flow orifice with the inlet and outlet passages. The flow orifice and inlet passage are respectively dimensioned and configured to provide a flow area characteristic such that a plot of percentage lift on the ordinate versus percentage flow area as the abscissa on log-log coordinates defines a substantially straight line of positive slope. According to the present invention, one of the inlet passage and the flow orifice is defined by a first peripheral shape comprising (i) a substantially straight leading edge disposed substantially perpendicular to the direction of travel of the plug member and (ii) a closure periphery, and the other is defined by a second peripheral shape comprising a tapered slot portion defined by substantially straight legs, the tapered slot portion being not greater in width than the length of said leading edge over at least a majority of its length. The tapered slot portion is positioned so that as the plug member moves from a fully closed position to intermediate throttling positions, the legs of the tapered slot portion first transect the first peripheral shape at the leading edge thereof, whereby to define, for at least a portion the travel of the plug member, a flow passageway having a triangular cross-sectional flow area. Further, the first peripheral shape defines an area greater than the area defined by the legs of the tapered slot portion, and the second peripheral shape comprises a base portion associated with the tapered slot portion. The second peripheral shape is dimensioned and configured so that when the flow orifice is fully registered with the inlet passage, the valve is substantially fully open to flow therethrough.

According to one aspect of the invention, the first peripheral shape may be configured as a truncated circle comprising the leading edge and a closure periphery configured as a circular arc portion. The second peripheral shape may be of ovoid cross section in that the base portion associated with the tapered slot portion may have a cross-sectional flow area which defines an arc of a circle of a diameter at least as great as the diameter of the circular arc portion of the first peripheral shape.

Thus, when the base portion of the second peripheral shape is fully registered with the first peripheral shape, the valve is fully open to flow therethrough. The legs of the tapered slot portion may be, at their ends opposite the apex ends, substantially tangential to the arc at the respective opposite ends of the arc. In a particular embodiment, the base portion associated with the tapered slot portion of the second peripheral shape may be congruent with the circular arc portion of the first peripheral shape.

Optionally, the inlet passage may be defined by the first peripheral shape comprising the leading edge and the flow orifice is defined by the second peripheral shape comprising the tapered slot portion.

According to another aspect of the invention, the tapered slot portion may have in flow cross section the shape of the legs of an isosceles triangle and the associated base portion may have the shape of an arc of a circle subtending from about 225 to about 270 degrees, the legs of the triangle defining at their apex ends an angle of from about 45 to 90 degrees and respectively extending one to each opposite end of the circular arc. In some cases, the circular arc of the base portion may subtend from about 235 to about 245 degrees and the legs of the isosceles triangle may define at their apex ends an angle of from about 55 to 65 degrees and respectively extend one to each opposite end of the circular arc. In a particluar embodiment, the angle defined at the apex of the isosceles triangle is about 60 degrees and the arc subtends about 240 degrees.

According to still another aspect of the invention, the tapered slot portion may have in flow cross section the shape of the legs of a triangle having an imaginary base, the legs defining at their apex an angle of from about 45 to 90 degrees, and the associated base portion may have the shape of an open-sided polygon, such as a rectangle. The imaginary base of the triangle may then coincide with the open side of the polygon. The legs of the triangle may define at their apex ends an angle of from about 55 to 65 degrees. For example, the legs of the triangle may define at their apex ends an angle of about 60 degrees. In a particular embodiment, the triangle may be an isosceles triangle and the rectangle may have a width approximately equal to the width of the inlet passage.

In an alternative embodiment of the invention, the inlet passage may be defined by the second peripheral shape comprising the tapered slot portion and the flow orifice may be defined by the first peripheral shape comprising the leading edge.

The following optional aspects of the invention may, but need not, be combined. The valve may have an area rangeability of about 51.7 based on a maximum flow obtained wherein the flow orifice is dimensioned and configured and may be positioned in normal operation so that the inlet passage is unobstructed. The valve may have a solids flow rangeability of about 64.3. Also, the inlet and outlet passages may be respectively located at radially opposite sides of the slide chamber. For example, the inlet and outlet passages may be coaxial. Further, the flow orifice may comprise an inlet segment facing the inlet passage of the flow passageway and an outlet segment facing the outlet passage of the flow passageway, and the cross-sectional area of the outlet segment may be equal to or greater than the maximum cross-sectional area of the inlet segment. The outlet segment may be dimensioned and configured so that at all operating positions of the plug member, the outlet passage is unconstricted by the plug member. Alternatively, the flow orifice may have a constant cross-sectional shape. The slide chamber may comprise a generally cylindrical bore and the plug member may be of generally cylindrical configuration. Also, the first peripheral shape may define a rectangle comprising the leading edge.

In a particular embodiment, the inlet segment may be configured to have a base portion with a cross-sectional flow area which defines three sides of a rectangle having a width at least as great as the effective diameter of the flow passageway.

According to still another aspect of the present invention, the positioning means may provide a limited stroke of the plug member in normal operation whereby the apex of the tapered slot portion does not extend beyond the closure periphery. The valve may have an area rangeability of about 75, based on a maximum flow area obtained wherein the apex coincides with the arc of the inlet passage.

Other aspects of the invention provide that the plug member may comprise a plurality of flow orifices therein and may be in sliding contact with the valve chamber.

Two or more of the above-described aspects of the invention may be combined in a single embodiment; other aspects of the invention will become apparent from the following detailed description.

BRIEF DESCRIPTION OF THE DRAWINGS

FIG. 7 is an assembly view in side elevation, with the valve body shown in section view for clarity of illustration, of a valve according to the present invention showing the plug member in wide-open operating position for solids flow;

FIGS. 7A–7C are schematic plan views showing the relative positions of the flow passageway of the valve body and the ovoidal flow orifice of a plug member during operation of the valve;

FIG. 9 is a side elevational view of the valve body of an embodiment of the invention having an outlet passage with an enlarged entry end;

DEFINITIONS AND DETAILED DESCRIPTION OF EMBODIMENTS OF THE INVENTION

Definitions

Before describing specific embodiments of the invention, it is useful to set forth some definitions of terms conventionally employed in the valve design art and as employed herein.

Figure 11:
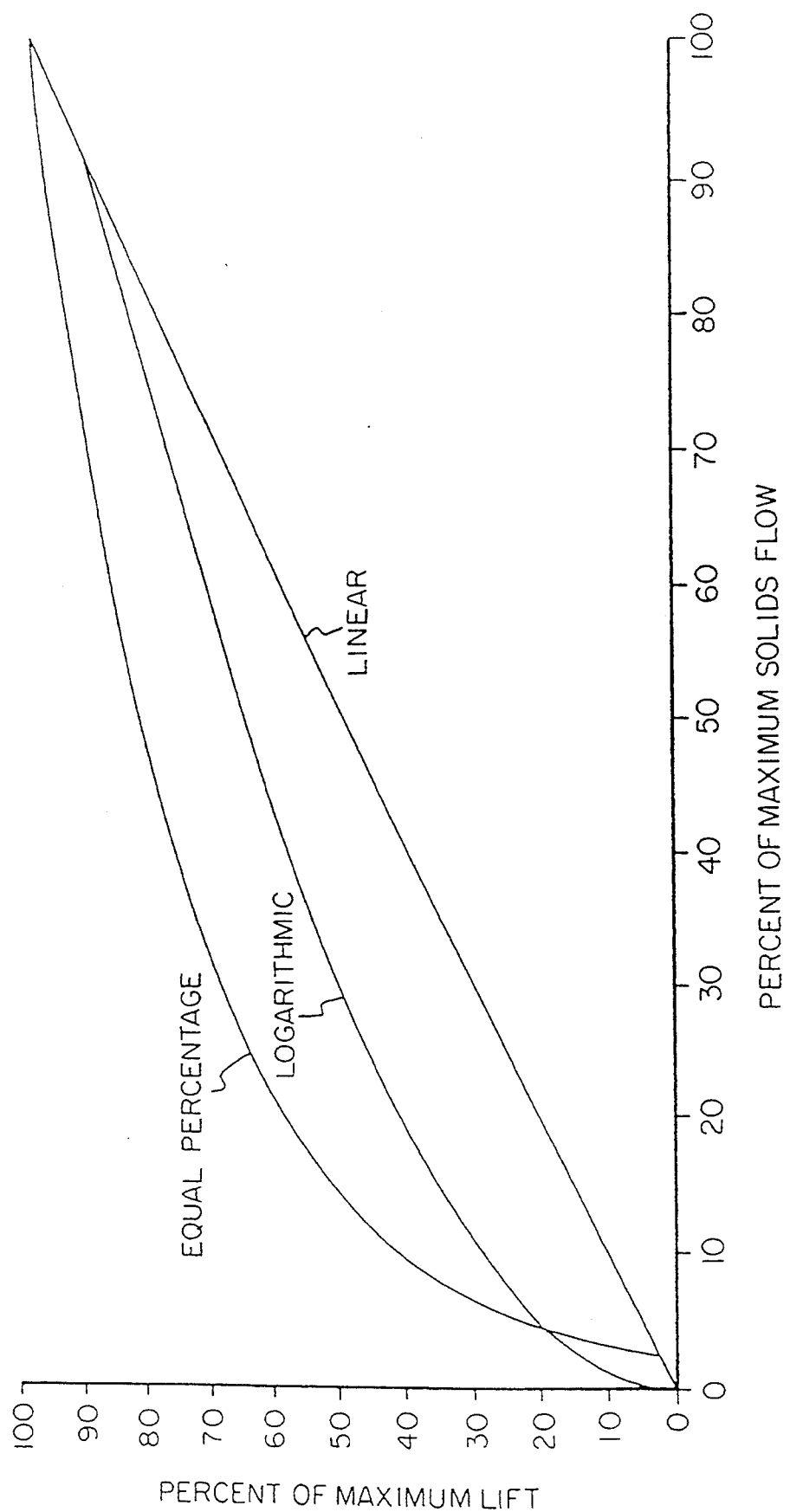
FIG. 11 is a plot of three control valve flow characteristics on Cartesian or arithmetic, i.e., non-logarithmic, scales, with percent of maximum lift on the ordinate and percent of maximum solids flow on the abscissa.

As is well known to those skilled in the art, a control valve design must take into account the desired flow characteristic of the valve, which flow characteristic is conventionally characterized as either a "linear" or "equal percentage" flow characteristic. In valves which display a linear flow characteristic, the quantity of flow is directly proportional to the lift or stroke of the valve. The lift or stroke of the valve is the amount of linear movement of the valve plug to adjust the effective size of the flow opening provided by the valve. "Maximum lift", as used herein and in the claims, means the full range of lift of the valve. The amount of lift in a given case is expressed as the percentage of maximum lift, e.g., "10% of maximum lift" means an amount of lift equal to 10% of the maximum lift. Reference herein and in the claims to a "percent of lift" or the like will, unless otherwise explicitly stated, be understood to mean a percent of maximum lift. The flow characteristic of a valve can be graphically plotted and is conventionally done by plotting the percent of maximum lift on the ordinate versus the flow through the valve on the abscissa, the flow being pressed as the percent of maximum flow through the valve. Reference herein and in the claims to a "percent of flow" or the like will, unless otherwise explicitly stated, be understood to mean a percent of maximum flow. Accordingly, at zero percent of maximum flow the valve is fully closed and at 100% of maximum flow the valve is fully open. For example, a flow characteristic plot for a linear flow characteristic valve is shown in FIG. 11, plotted with the lift as the ordinate versus flow as the abscissa on Cartesian, i.e., arithmetic, coordinates and yields a straight line (labelled "LINEAR" in FIG. 11) which is of unitary slope.

In valves which display an equal percentage flow characteristic, the change in quantity of flow per unit change in lift is proportional to the quantity flowing before the unit change in lift is made. As shown in FIG. 11, a plot of the flow characteristic of an equal percentage flow valve results in a curved line (labelled "EQUAL PERCENTAGE" in FIG. 11) which is concave downward.

Figure 12:
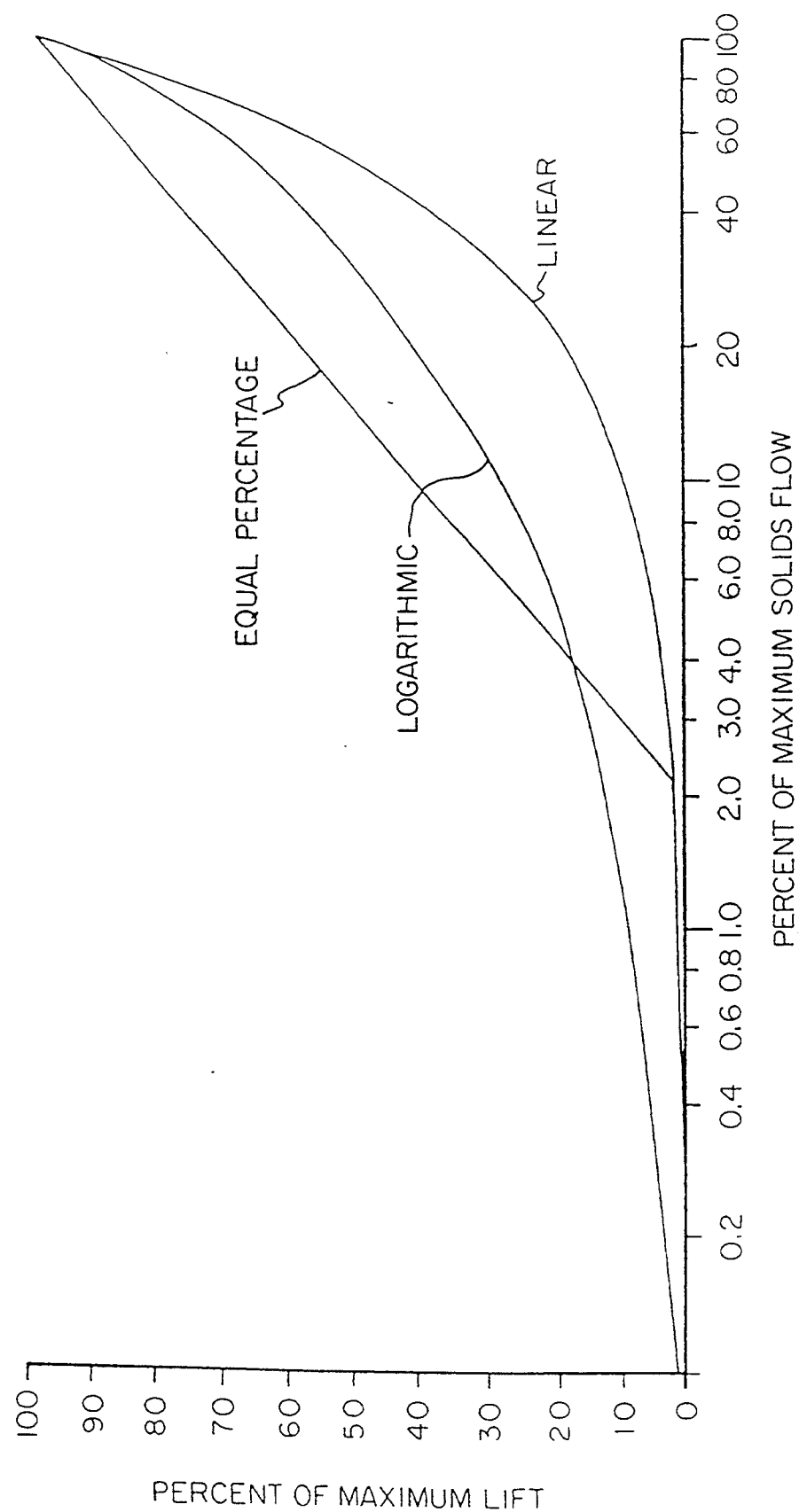
FIG. 12 is a plot of the data of FIG. 11 with an arithmetic ordinate and a logarithmic abscissa, i.e., a semi-log plot of the data of FIG. 11.

FIG. 12 shows a plot of percent of maximum lift an arithmetic ordinate versus percent of maximum flow on a logarithmic abscissa, i.e., a semi-log plot, and shows that on such a semi-log plot the linear flow characteristic is a curved, concave upward line (labelled "LINEAR" in FIG. 12) and the equal percentage flow characteristic results in a straight line (labelled "EQUAL PERCENTAGE" in FIG. 12) of positive slope.

Rangeability, conventionally expressed as a "flow" rangeability, is an inherent property of any given flow control valve and is normally defined as the ratio of maximum controllable flow to the minimum controllable flow of which the valve is capable while maintaining a particular desired flow characteristic. For any given service, a valve is conventionally designed for a planned maximum flow of about 70 percent of the maximum flow attainable in that service with the valve in its full open position. The reason for this is to provide additional capacity in the valve to allow for uncertainties in design, pressure drop and flow parameters and to accommodate increased flow requirements during transient upset conditions. Further, as may be seen in FIG. 11 in the case of a valve of equal percentage flow characteristic, 70 percent of maximum flow corresponds to about 90 percent of maximum lift. In normal operation, it is not considered desirable to operate within 10 percent of the minimum or maximum lift (i.e., in the ranges of 0–10% or 90–100% of lift) because that is too close to the ends of the operating range of the valve. Therefore, as regards valve lift, it is deemed prudent to provide for controlling flow by manipulation of the valve within the range of about 10 percent to about 90 percent of maximum lift. Accordingly, having reference to the above description, as used herein and in the claims, the term "rangeability" is defined as the ratio of percent maximum flow at design capacity (70% of maximum flow) divided by the percent maximum flow existing at 10 percent of maximum lift.

Another valve property, related to rangeability as defined above, is "Area Rangeability," which is defined herein as the ratio of the percent of maximum flow cross-sectional area at design capacity divided by the percentage of the maximum flow cross-sectional area at ten percent lift. To avoid confusion with "flow" rangeability in the computation of these area rangeability valve characteristics, the flow cross-sectional area at design capacity is taken to be 75% of the maximum flow cross-sectional area available. Thus, like rangeability, area rangeability is a measure of the degree to which the valve can control flow while operating within preferred physical limitations, i.e., while operating between ten percent lift and the lift corresponding to 75% of the maximum available flow cross section area. An advantage of using area rangeability instead of "flow" rangeability as a valve characteristic is that values of area rangeability may be directly calculated for any valve. By contrast, when dealing with "flow" rangeability, such calculations cannot be made without taking into account the coefficients of discharge of the valves being compared, which coefficients may vary with percent valve openings, and which can only be determined by testing the valves. This problem is avoided by using area rangeability, which is independent of the coefficients of discharge. However, a numerical relationship between flow rangeability and area rangeability may be established for valves for which the coefficient of discharge is known. (The coefficient of discharge is a valve characteristic known to those skilled in the art, and is generally discussed in Perry's Chemical Engineers' Handbook, 3rd Ed. 1950 at pages 401–403, which are hereby incorporated herein by reference as background information.) For example, for a full stroke solids valve used to control the flow of dense phase fluidized solids, the coefficient of discharge is $C_d=0.6$ for the first 0–50% of cross-sectional flow area opening; and increases linearly to $C_d=0.8$ at 100% area opening. These values for $C_d$ can be used to relate area rangeability to flow rangeability for those valves according to the present invention as are characterized in FIG. 14 for which, at 10 percent stroke, the cross-sectional flow area of the valve is 1.45% of maximum flow area. Accordingly, these valves have an area rangeability of $75/1.45=51.7$. The corresponding flow rangeability is equal to the ratio of percent maximum flow at design capacity (70% of maximum flow) divided by the percent maximum flow at 10 percent lift. The percent maximum flow at 10 percent lift equals the percent area at 10 percent lift times the ratio of the coefficient of discharge at 10% lift to the coefficient of discharge at maximum operation, i.e., the percent maximum flow at 10% lift is 1.45%, $(0.6/0.8)=1.088\%$. The flow rangeability of the valve is then $(70/1.088)=64.3$. In general, the area rangeability of such valves can be converted to flow rangeability as follows:

flow rangeability = area rangeability * (70/75)
* $(C_{d\ max}/C_{d\ 10\%})$

In the present case,
$(C_{d\ max}/C_{d\ 10\%})$ * (70/75) = (0.8/0.6) * (70/75) = 1.244.

Figure 14:
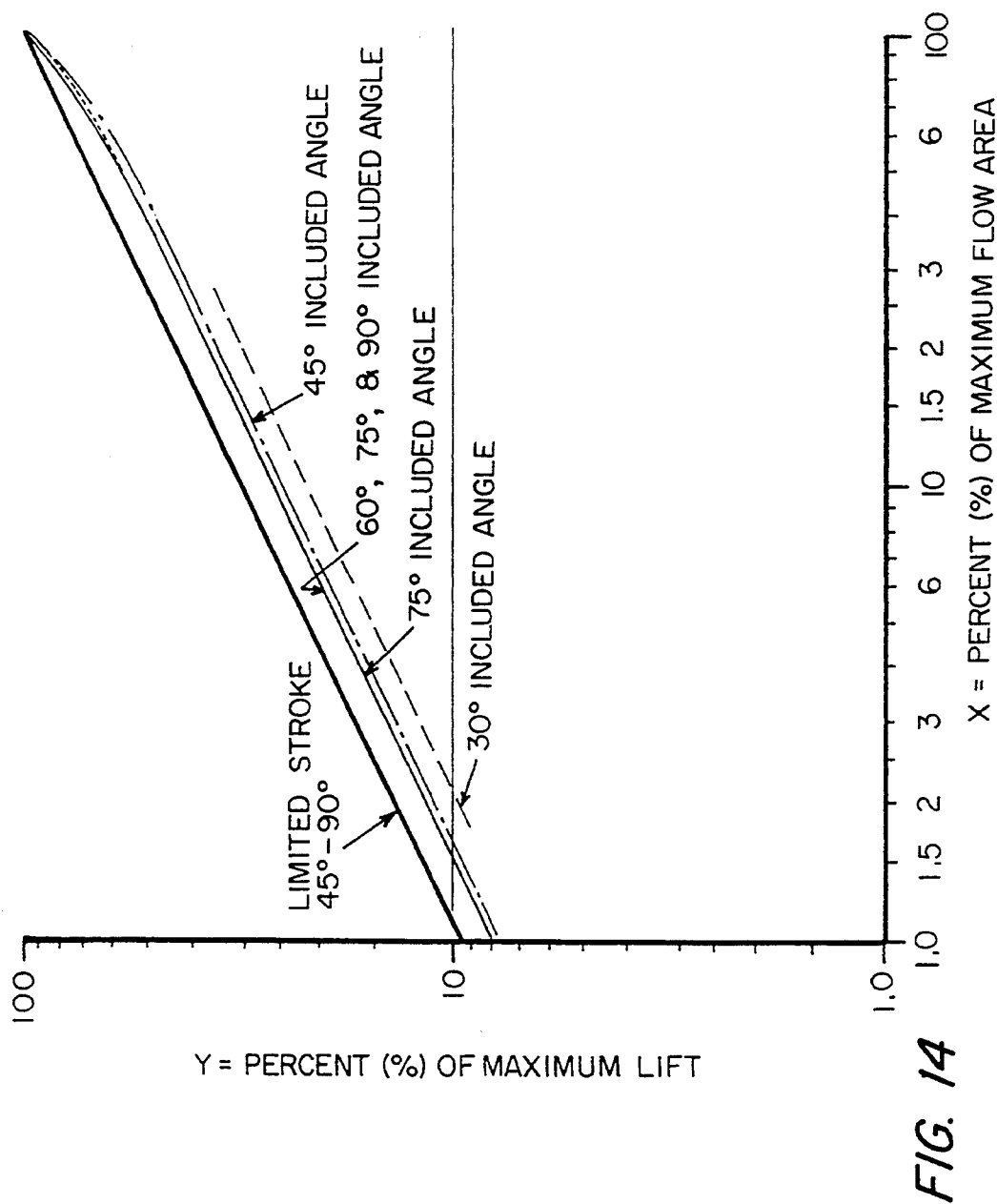
FIG. 14 is a log-log plot of the percent of maximum lift on the ordinate and percent maximum flow area on the abscissa for a variety of flow orifices having differing apex angles.

Accordingly, for valves characterized in FIG. 14, flow rangeability = area rangeability * 1.244.

Still another valve property useful in describing operation of a valve is its "unit sensitivity" which, as used herein, is defined as the percentage change of existing flow per one percent change of maximum lift. In the context of this definition, "existing flow" is the flow prior to commencing the one percent increment in lift.

A detailed description of linear and equal percentage flow characteristics, rangeability and unit sensitivity is contained in a publication entitled *Masoneilan Control Valves and Auxiliary Equipment*, Catalog No. 310, Fourth Edition, 1963, Worthington Corporation, Masoneilan Division, Norwood, Mass. 02062. The entire content of this publication is incorporated by reference herein.

EMBODIMENTS OF THE PRESENT INVENTION

Figure 13:
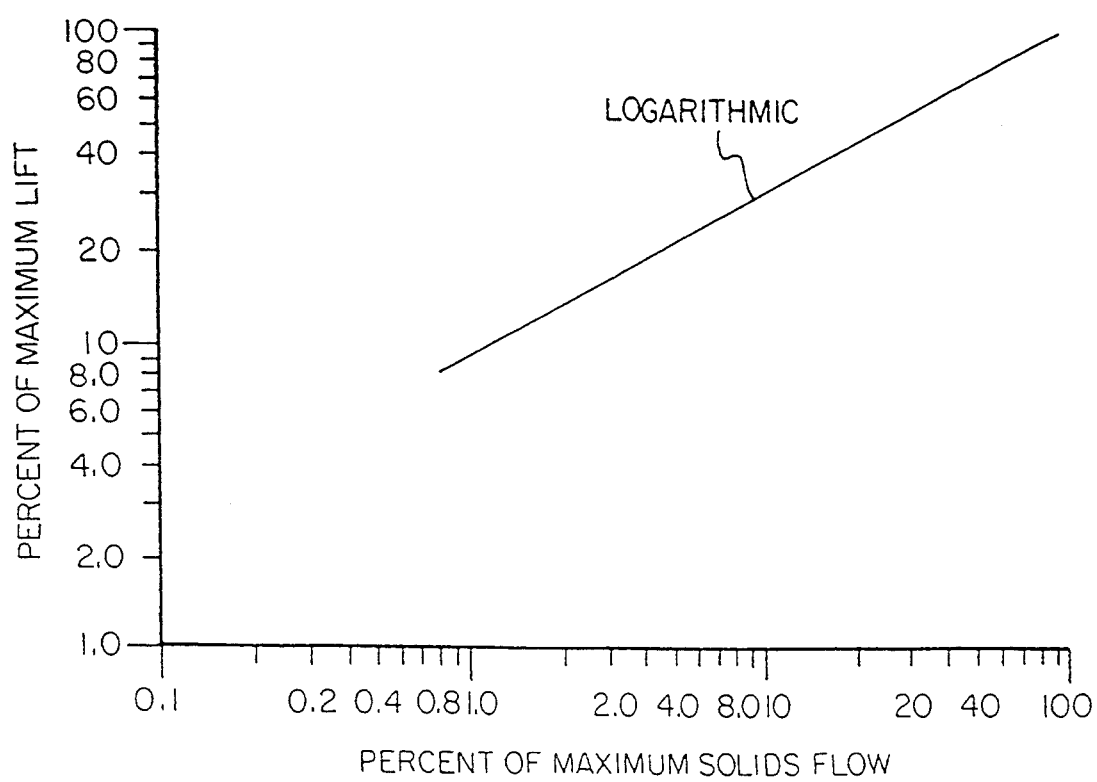
FIG. 13 is a plot of the data of the curve labelled "LOGARITHMIC" in FIGS. 11 and 12, with logarithmic ordinate and abscissa scales, i.e., a log-log plot of the "LOGARITHMIC" curve data of FIGS. 11 and 12.

Valves designed in accordance with the present invention exhibit a unique flow characteristic and enhanced rangeability. Valves in accordance with the present invention display a flow characteristic which is intermediate to the linear and equal percentage flow characteristics for most of the flow range as shown by FIGS. 11 and 12 in which the flow characteristic lines of valves in accordance with the present invention are labelled "LOGARITHMIC" and comprise, in the arithmetic plot of FIG. 11, a concave down-curved line and in the semi-log plot of FIG. 12 a concave up-curved line. The flow characteristic of valves in accordance with the present invention are referred to as "logarithmic" because, as shown by FIG. 13, when a plot of percent of maximum lift versus percent of maximum flow is made on logarithmic scales for both ordinate and abscissa, i.e., on log-log scales, a straight line, labelled "LOGARITHMIC" in FIG. 13, results. In FIG. 13, as in FIGS. 11 and 12, the percent of maximum lift is on the ordinate and the percent of maximum flow is on the abscissa.

A specific embodiment of a valve in accordance with the present invention, i.e., a valve displaying a "logarithmic" flow characteristic, is shown in FIGS. 1–7.

Figure 1:
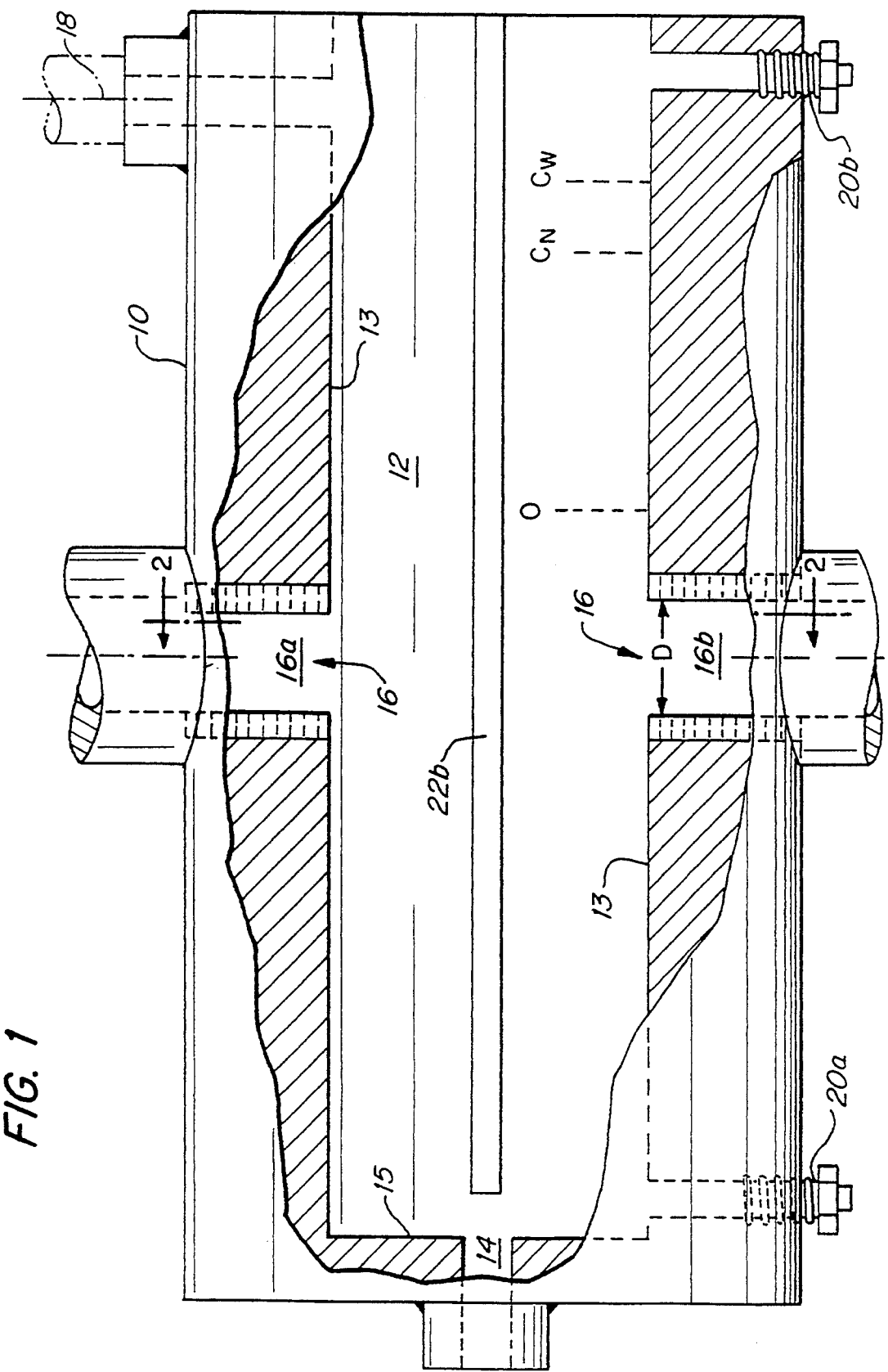
FIG. 1 is a side elevational view of the valve body of one embodiment of the present invention, with portions broken away for clarity of illustration.
Figure 5:
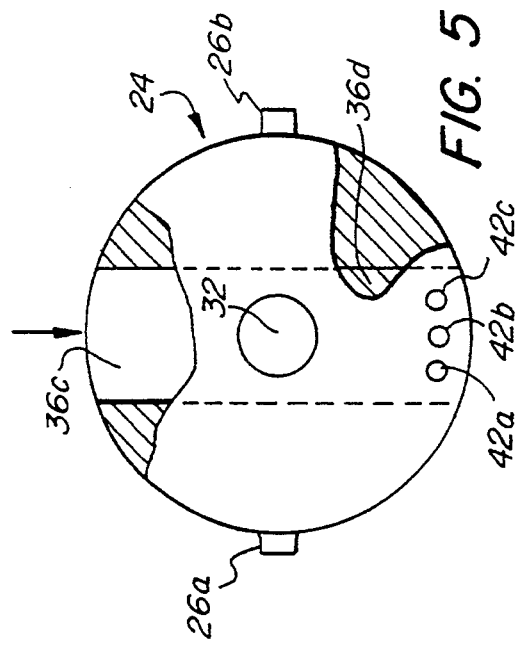
FIG. 5 is an end view along line 5—5 of FIG. 3.
Figure 6:
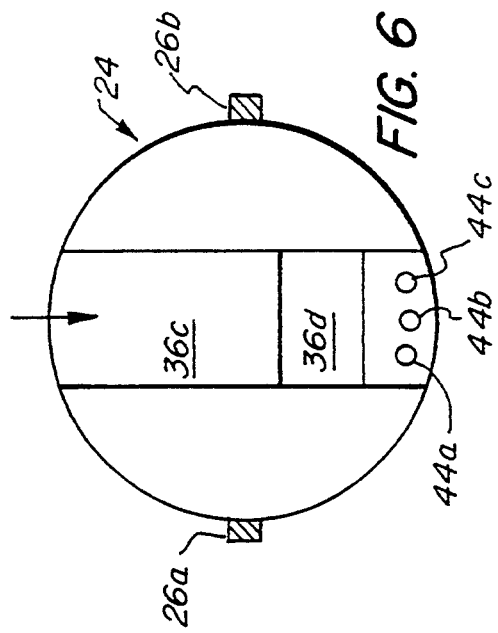
FIG. 6 is a section view along line 6—6 of FIG. 4.

Referring to FIG. 1, there is shown a valve body 10 having a slide chamber 12 comprising a substantially cylindrical bore defined in part by interior wall 13 and an end wall 15. In other embodiments, slide chamber 12 may have any suitable cross-sectional shape, e.g., square, rectangular, oval, triangular, etc., with a correspondingly shaped plug member mounted therein. Obviously, the outside of the valve body may be of any suitable cross-sectional configuration, independent of the cross-sectional configuration of the slide chamber. Each end of valve body 10 has respective purge gas inlets 14, 18 positioned in flow communication with slide chamber 12. The right hand end (as viewed in FIG. 1) of slide chamber 12 is open to receive therein a slidable plug member, as described below, after which the open end of valve body 10 is sealed by any suitable shaft sealing means (FIG. 7) not shown in FIG. 1.

A flow passageway extending radially through valve body 10 is generally indicated at 16 and is provided in part by inlet passage 16a and outlet passage 16b, which extend transversely through valve body 10 and intersect slide chamber 12. In the illustrated embodiment of FIG. 1, a pair of blow down connections 20a, 20b are provided. These are used to sweep particulates from the purge gas chambers with a fluid as may be needed in the event of loss of purge gas supply during operation.

Figure 2:
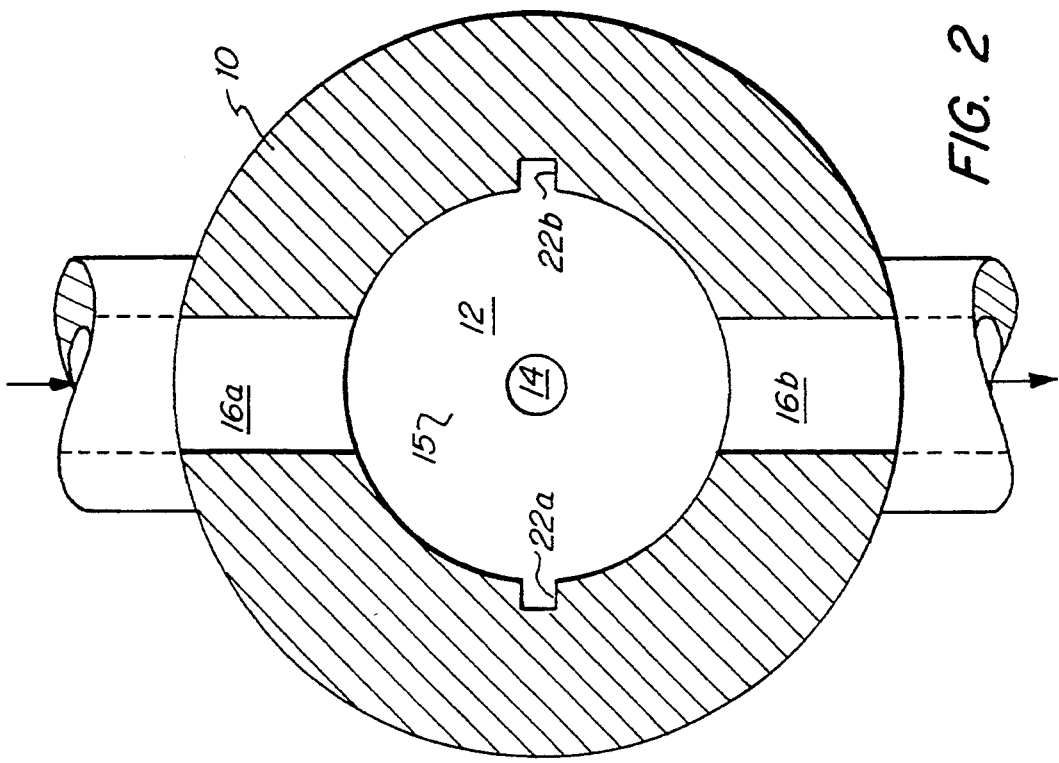
FIG. 2 is a section view taken along line 2—2 of FIG. 1.

As best shown in FIG. 2, substantially cylindrical slide chamber 12 is intersected by inlet and outlet passages 16a, 16b and has formed along its axial length an opposed pair of grooves 22a and 22b. Only groove 22b is visible in FIG. 1.

Figure 3:
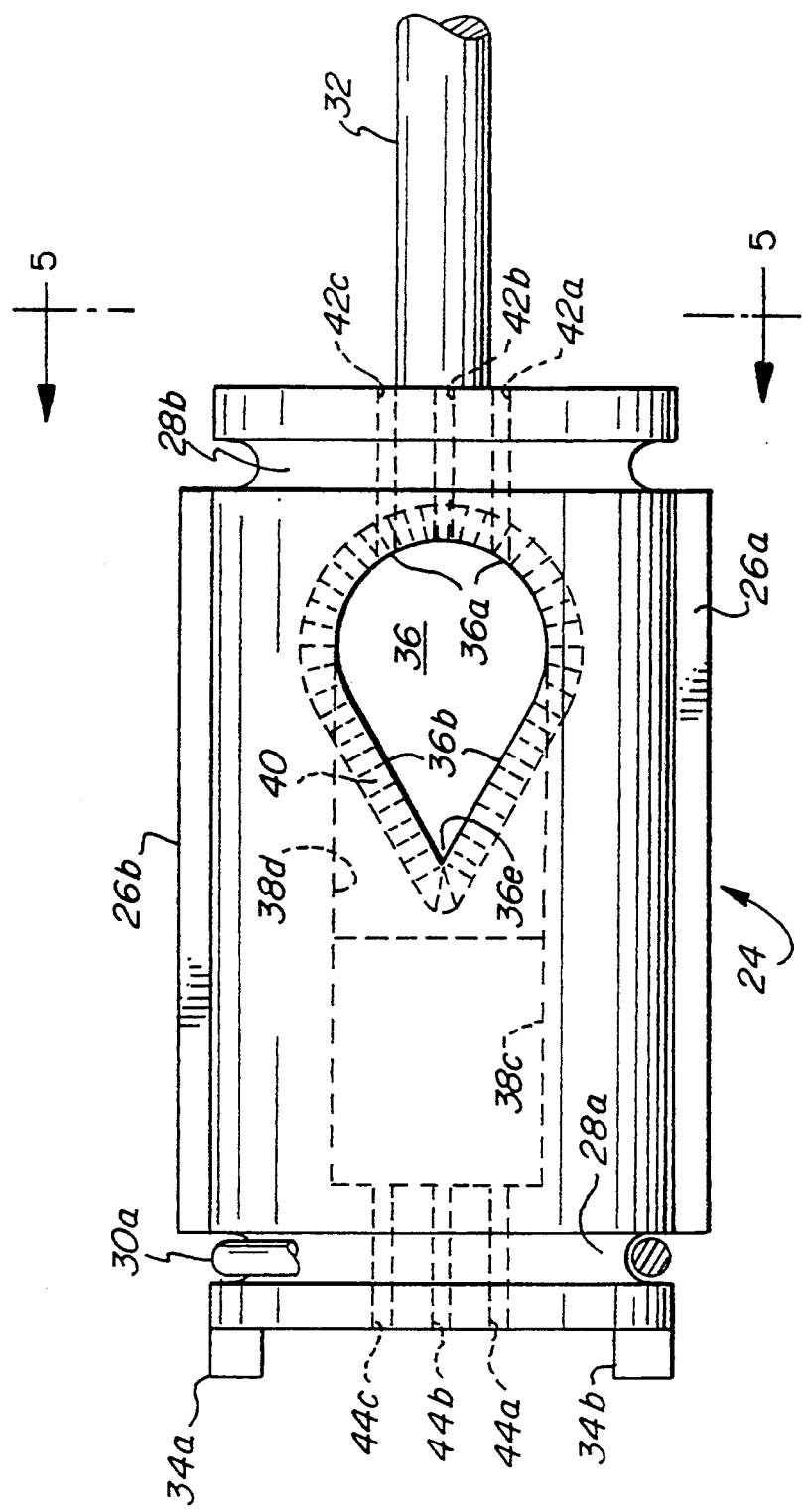
FIG. 3 is a plan view of a plug member having an ovoidal flow orifice therein and adapted to be slidably mounted within the valve body of FIG. 1.
Figure 4:
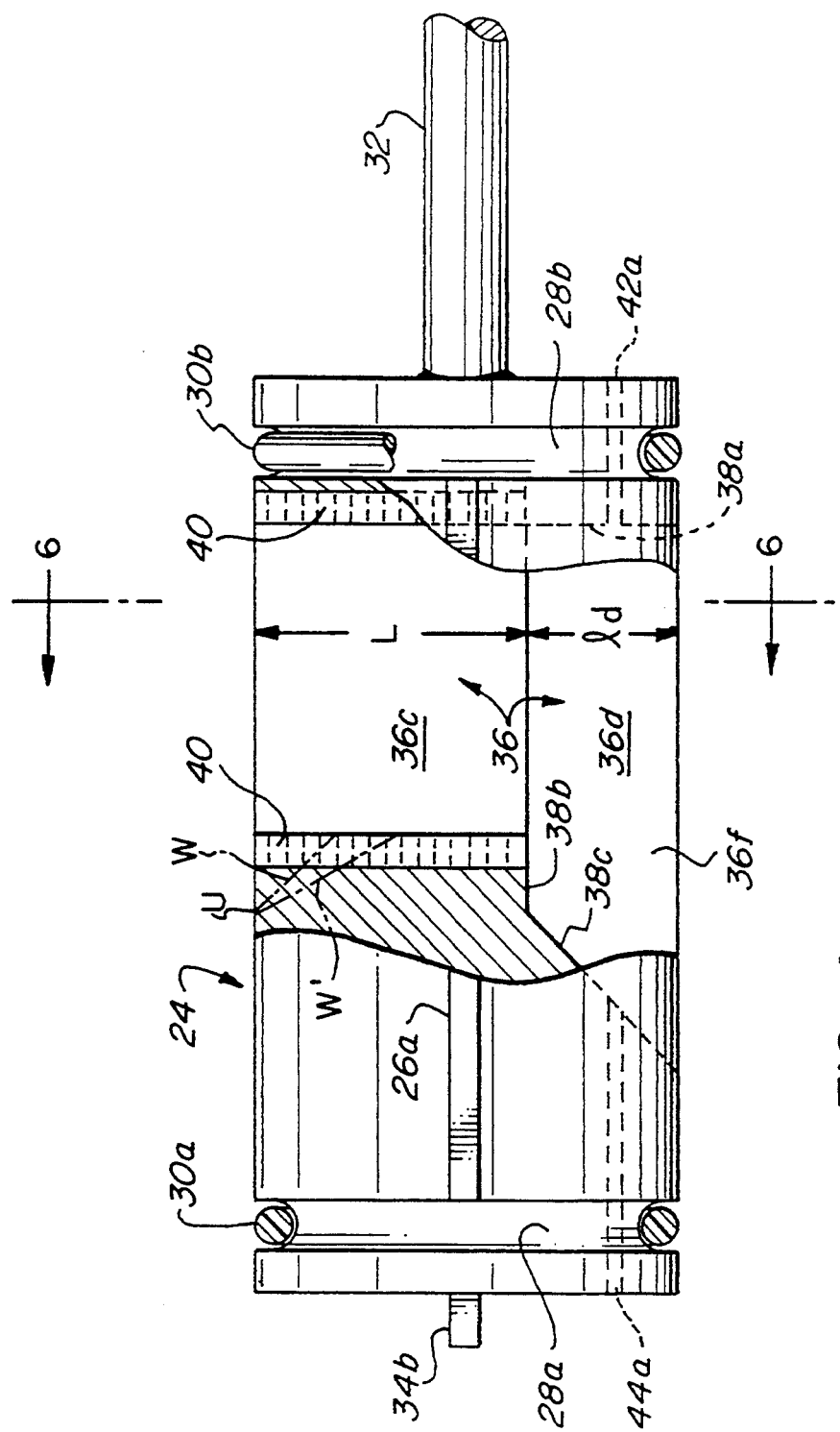
FIG. 4 is a side elevational view of the plug member of FIG. 3 with parts broken away for clarity of illustration.

Referring now to FIGS. 3 and 4, plug member 24 is of generally cylindrical configuration and has a pair of guide rails 26a, 26b formed on radially opposite sides thereof. Guide rails 26a, 26b, which may be of any suitable configuration, are generally rectangular in cross section and are configured and dimensioned to be slidably received within, respectively, grooves 22a and 22b to mount plug member 24 for slidable movement within valve body 10. Circular, circumferential grooves 28a and 28b are formed adjacent opposite respective ends of plug member 24 and contain therein, respectively, annular seal rings 30a, 30b. These seal rings may be made of any suitable material, for example, of the same grade of steel as the valve body and plug, and are radially cut to form a gap therein in the same manner as piston rings. This permits the seal rings to be opened for emplacement over grooves 22a, 22b and then compressed to reduce the gap and fit the seal rings within slide chamber 12 in a manner analogous to that in which piston rings are mounted on a piston head within a cylinder. The nearly-closed gaps are shown at g and g' in FIG. 7. For improved clarity of illustration, annular seal ring 30b is omitted from FIG. 3 and rings 30a and 30b are shown partially broken away and/or in cross section in FIG. 4. Annular seal rings 30a, 30b are preferably made of any suitable heat-resistant, spring-like metal and are dimensioned and configured with a radial gap formed therein so that, upon closure, they bear against the interior wall 13 of slide chamber 12 in sliding, sealing engagement therewith, in the manner of a piston ring bearing against a cylinder wall.

The right hand end, as viewed in FIGS. 3 and 4, of plug member 24 has affixed thereto positioning means comprising a shaft 32 which may be connected to any suitable device, such as a manually or motor driven wheel or other device, for example, a piston operator, adapted to move plug member 24 within slide chamber 12 of valve body 10 so as to position it as desired, as described below. The opposite or left hand end of plug member 24, as viewed in FIGS. 3 and 4, has affixed thereto a pair of stops 34a, 34b (only 34b being visible in FIG. 4). The outer ends of stops 34a, 34b are adapted to contact end wall 15 to set a limit to the leftward (as viewed in FIG. 1) travel distance of plug member 24.

Figure 3A:
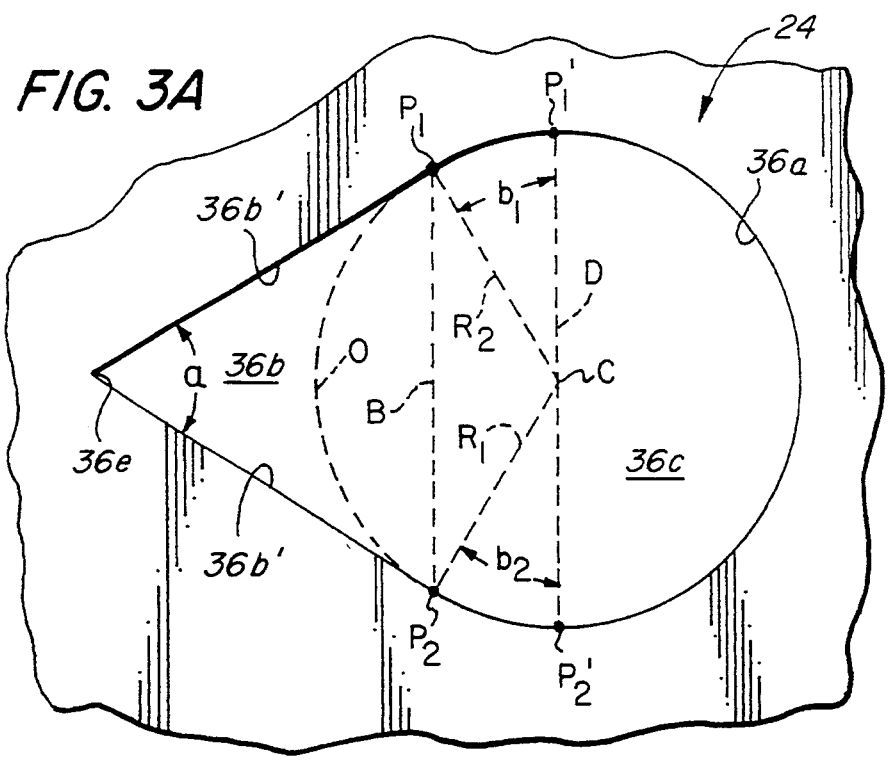
FIG. 3A is a plan view similar to that of FIG. 3, but on an enlarged scale and with the plug member broken away, showing geometric reference points and lines applied to the inlet segment of the flow orifice.
Figure 3B:
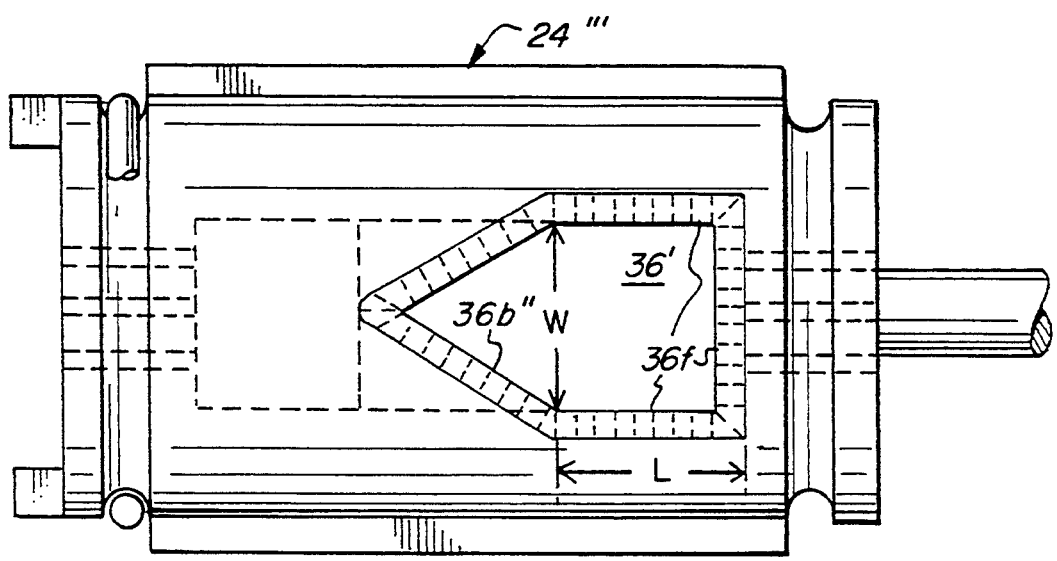
FIG. 3B is a plan view similar to that of FIG. 3 but showing a plug member with a flow orifice having a rectangular base portion.
Figure 3C:
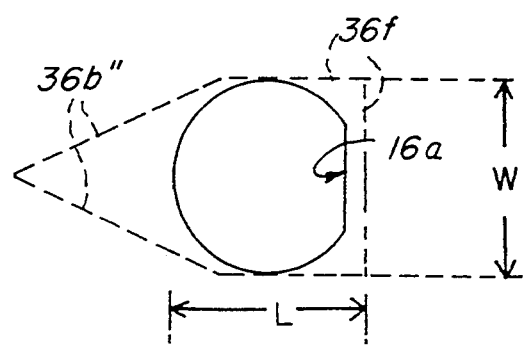
FIG. 3C is a schematic plan view showing the rectangular base portion of the plug member of FIG. 3B in full register with the flow passageway.
Figure 3D:
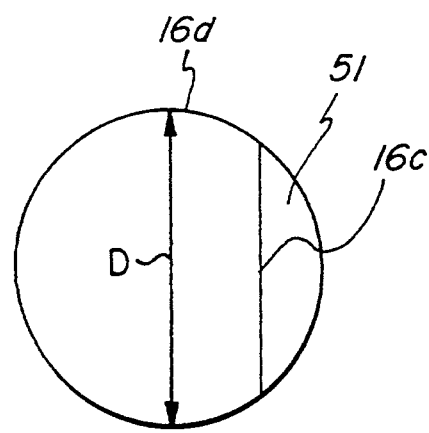
FIG. 3D is a schematic plan view showing the peripheral shape of an inlet passage according to one embodiment of the present invention.

In conventional valves, the inlet passage to the valve body provides a circular cross-sectional flow area, i.e., the inlet passage has a circular peripheral shape. In valves according to the present invention, however, inlet passage 16a has a peripheral shape that includes either a substantially straight leading edge or a tapered slot portion, and is thus not circular. Whichever of these features characterizes the peripheral shape of the inlet passage, the peripheral shape of the flow orifice will be characterized by the other feature, as will be discussed more fully below. A valve comprising a conventional inlet passage having a circular peripheral shape can easily be adapted to have a substantially straight peripheral leading edge or a tapered slot portion according to an embodiment of the present invention by fixing an appropriately configured plug in the circular inlet passage. An inlet passage configured according to one embodiment of the present invention is shown in FIG. 3D where inlet passage 16a is seen to have a substantially straight leading edge 16c, and a circular arc portion 16d and was formed by mounting a segmental plug 51 into a conventional circular inlet passage. The resulting inlet passage has a peripheral shape that can be characterized as a truncated circle, or as a circular arc subtended by a chord. Preferably, the chord does not subtend an internal angle of greater than 120° measured at the center of the circular arc, since the necessary plug would unduly restrict the cross-sectional flow area of the inlet passage. As will be discussed below, the cross-sectional flow area provided by the valve according to this invention is principally defined by the combination of (i) a leading edge of the peripheral shape of one of the inlet passage and the flow orifice and (ii) a tapered slot portion of the peripheral shape of the other. As such, the configuration of the peripheral shape having the leading edge, aside from the leading edge itself, is of secondary significance, provided it permits adequate overall cross-sectional flow area. Thus the portion of the peripheral shape that joins the ends of the leading edge to enclose the cross-sectional flow area, referred to herein as the closure periphery, can be varied widely within the scope of the invention. For example, the closure periphery need not have the shape of circular arc portion 16d to form a truncated circle, it may instead cooperate with the leading edge to yield the peripheral shape of a rectangle or some other geometric shape.

Plug member 24 has a flow orifice 36 extending radially therethrough. As best seen in FIG. 4, flow orifice 36 comprises an inlet segment 36c, which is of ovoid cross section as best seen in FIGS. 3 and 3A, and an outlet segment 36d of expanded cross section. The "cross section" referred to herein is the flow cross section, i.e., the cross-sectional shape through which the solids flow. As viewed in FIGS. 3 and 3A, inlet segment 36c of flow orifice 36 is roughly teardrop or egg-shaped in cross-section having a circular arc base portion 36a, and a tapered slot portion 36b which terminates in an apex 36e. Inlet segment 36c of flow orifice 36 is lined with a hard facing material 40, such as Stellite or any other suitable highly wear-resistant material. The cross-sectional flow-constricting shape of inlet segment 36c of flow orifice 36 is shown approximately in scale in FIG. 3A, which base portion 36a and tapered slot portion 36b are shown in solid-line rendition with imaginary geometric lines shown in dash-line rendition. Base portion 36a is seen to coincide with or comprise an arc of about 240 degrees of a circle O whose center is at C. Paired, opposite sides of tapered slot portion 36b may be considered to coincide with or comprise legs 36b' of an isosceles triangle whose base is given by imaginary line B. Legs or sides 36b' are substantially tangential to circle O at, respectively, points $P_1$ and $P_2$ where the base B meets legs 36b'. In other words, legs 36b are substantially tangential to the arc of base portion 36a, at the opposite ends of the arc. Points $P_1$ and $P_2$ are located at points on circle O which are displaced 30 degrees of arc towards the tapered slot portion from the points of intersection $P_1'$, $P_2'$ of a diameter D of circle O taken parallel to base Angles $b_1$ and $b_2$ are subtended by a radius of diameter D and, respectively, radii $R_1$ and $R_2$ of circle O, and are each about 30 degrees. Angle $a$, defined by legs 36b', is about 60 degrees.

Figure 3E:
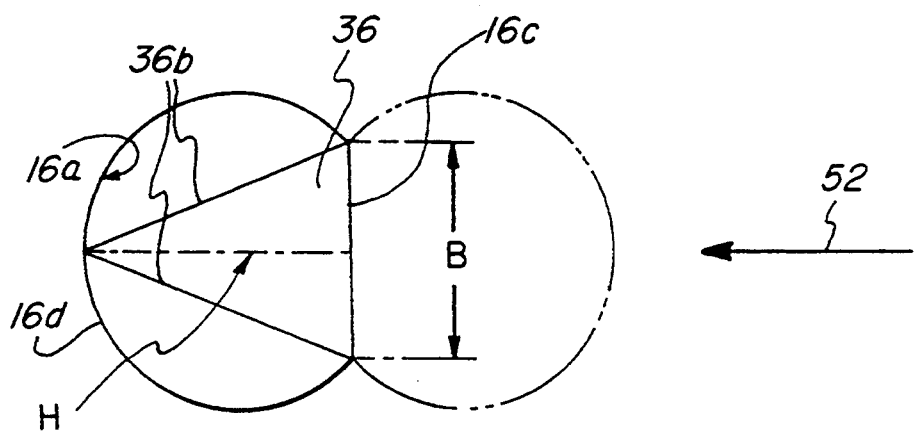
FIG. 3E is a schematic plan view of a tapered slot portion of flow orifice having an apex positioned to coincide with the circular arc portion of the inlet passage of FIG. 3D.

As described above, inlet passage 16a (FIGS. 1, 3D and 7) has a circular arc portion having a diameter which is substantially equal to that of circle O of flow orifice 36 (FIGS. 3 and 3A). Leading edge 16c of the peripheral shape of inlet passage 16a is disposed substantially perpendicular to the direction of travel of plug member 24 indicated by arrow 52 in FIG. 3E so that when plug member 24 advances from a fully closed position toward intermediate throttling positions in which flow orifice 36 comes into increasing registration with inlet passage 16a, the legs of the tapered slot portion first intersect the peripheral shape of inlet passage 16a at leading edge 16c, as generally illustrated in FIGS. 3E and 7B. As illustrated in these figures, the width of the tapered slot portion is preferably less than the length of the leading edge over at least a majority of the length of the tapered slot portion. As used herein and in the claims, the width of a peripheral shape or of a portion thereof is generally meant to refer to its largest dimension as measured in a direction perpendicular to the direction of travel of the plug member; its length is generally measured in the direction of travel of the plug member. A valve with a flow passageway of this configuration will provide enhanced rangeability (as described in detail below) and the logarithmic characteristics plotted in FIGS. 11, 12, 13 and 14.

Obviously, some departure may be made from the specific geometric relationships shown in FIG. 3A and described above and still obtain valves having enhanced rangeability and a flow characteristic close to the logarithmic characteristics of FIGS. 11, 12, 13 and 14. Thus, angle $a$ may be at least about 45 to about 90 degrees, for example, from about 55 to about 65 degrees, preferably from about 60 to 75 degrees and in a specific example, 60 degrees. Similarly, the angles $b_1$ and $b_2$ are from about 22.5 to 45 degrees, for example, from about 27.5 to about 32.5 degrees, preferably from about 30 to 37.5 degrees, or in the specific example, 30 degrees or, stated otherwise, the arc of circle O subtended by base portion 36$a$ may be from about 225 to 270 degrees, for example, from about 235 to 245 degrees, and in the specific example, 240 degrees.

In an alternative embodiment of the present invention, the flow cross section of the inlet segment of the flow orifice discussed above may have a rectangular base portion instead of a circular arc. Therefore, as shown in FIG. 3B, plug 24''' is equipped with a flow orifice 36' having a tapered slot portion determined by edges 36$b$'' and a rectangular base portion 36$f$ defined by three sides 36$f$. The base of the imaginary isosceles triangle coincides with the open fourth side of the rectangle. Plug 24''' is otherwise similar to plug 24 shown in FIG. 3A, so structures of plug 24''' corresponding to those of plug member 24 (FIG. 3A) have been left unnumbered in FIG. 3B, for simplicity. Preferably, the width W of the rectangular base portion 36$f$, which is measured at right angles to the direction of travel of plug 24''', is at least equal to the diameter of the circular inlet passage. The length L of the base portion is preferably dimensioned so that the flow cross section of inlet orifice 36$c$' is greater than that of inlet passage 16$a$ (FIG. 1), and so that orifice 36$c$' allows substantially unobstructed flow when the base portion is fully registered with inlet passage 16$a$, as shown in FIG. 3C. In alternative embodiments, the base portion of orifice 36' may be configured as a polygon other than a rectangle, with one side coinciding with the base of the isosceles triangle as discussed above.

The above-described embodiments of a flow orifice having a tapered slot portion and a base portion find particular utility in embodiments of the invention in which, during the normal course of operation, the plug member by be expected to travel from a fully closed position to one in which the base portion of the flow orifice is fully registered with the inlet passage. Such embodiments are referred to herein as "full stroke" embodiments. In the initial stages of movement of the plug member from a fully closed position to a fully open position of a full stroke valve, the apex of the tapered slot portion of the flow orifice first intersects the leading edge of the inlet passage, creating a flow passageway having a triangular cross-sectional flow area including an apex defined by the apex of the tapered slot portion and a base defined by the leading edge of the inlet passage. Subsequently, the cross-sectional flow area may lose its triangular shape. For instance, the legs of the tapered slot portion may intersect a part of the closure periphery of the inlet passage, e.g., circular arc portion 16$d$, thus truncating the apex of the triangle or, if the legs of the tapered slot portion are wider than the leading edge of the inlet passage, the triangle may be truncated at the sides of the base. Despite such truncations, if the cross-sectional flow area is triangular for at least a substantial portion of the travel of the plug member, the flow characteristic of full stroke embodiments of the invention are substantially logarithmic and fall within the scope of the invention. However, it has been found by the inventor that the logarithmic flow characteristic of valves according to the present invention is enhanced by limiting the travel of the plug member so that the flow passageway has a triangular cross-sectional flow area over a greater relative proportion of the overall travel of the plug member. To this end, the stroke of the plug member may be limited in order to avoid truncating the triangular cross-sectional flow area in the ways described above. For example, in embodiments of the invention in which the inlet passage has the peripheral shape of a truncated circle, it may be desired to limit the stroke of the plug so that the apex of the tapered slot portion of the flow orifice may coincide with, but not intersect, the circular, arc portion of the inlet passage. This strategy preserves at least the apex of the triangular cross-sectional flow area and can be adapted to inlet passages having closure peripheries other than a circular arc. Alternatively, it may be desired to limit the travel of the plug member so that the cross-sectional flow area of the flow passageway is triangular at all times during normal operation, yielding a logarithmic flow characteristic and an optimum area rangeability of 75, as will be discussed below. It should be noted that even when the stroke of the plug member is limited in this way, it may be useful to provide a flow orifice having both a tapered slot portion and a base portion so that in the event of a valve blockage, the normally limited stroke of the plug member can temporarily be exceeded to bring the base portion into register with the inlet passage, thus facilitating flow-through of congested materials. Once the blockage is dissipated, the plug member can be returned to its normally limited stroke operation as described herein.

When plug member 24 is mounted within valve body 10, inlet segment 36$c$ faces inlet passage 16$a$, and outlet segment 36$d$ faces outlet passage 16$b$. Outlet segment 36$d$ is an expanded opening of stepped configuration defined by its interior walls 38$a$–38$e$ inclusively, to provide a substantially trapezoidal-shaped, expanded cross section outlet segment 36$d$. In the embodiment of FIGS. 3-6, inlet segment 36$c$ of flow orifice 36 has a length (indicated by dimension line L) which is somewhat in excess of one-half of the diameter of plug member 24. However, the length L may be of any suitable dimension which will provide adequate wear-resistance as described in more detail below.

As best shown in FIGS. 3-6, one or more fluidizing gas inlet passages 42$a$, 42$b$, and 42$c$ are formed in plug member 24 and extend from one end (the right hand end viewed in FIGS. 3 and 4) of plug member 24 to outlet segment 36$d$ of flow orifice 36. Another similar set of fluidizing gas inlet passages 44$a$, 44$b$, and 44$c$ are formed in the opposite end (left hand end as viewed in FIG. 3)

and extend therefrom to outlet segment 36d of flow orifice 36.

FIG. 7 shows plug member 24 mounted for sliding movement within valve body 10, guide rails 26a, 26b being received for sliding movement within, respectively, grooves 22a, 22b. The right hand end (as viewed in FIG. 7) of valve body 10 is closed by an end seal 46 which is attached to valve body 10 by any suitable means, e.g., by a series of bolts 48, and which has a central passage therein (unnumbered) for passage of shaft 32 therethrough. Shaft sealing means 50 provides for a sliding gas-tight seal for shaft 32.

Figure 8C:
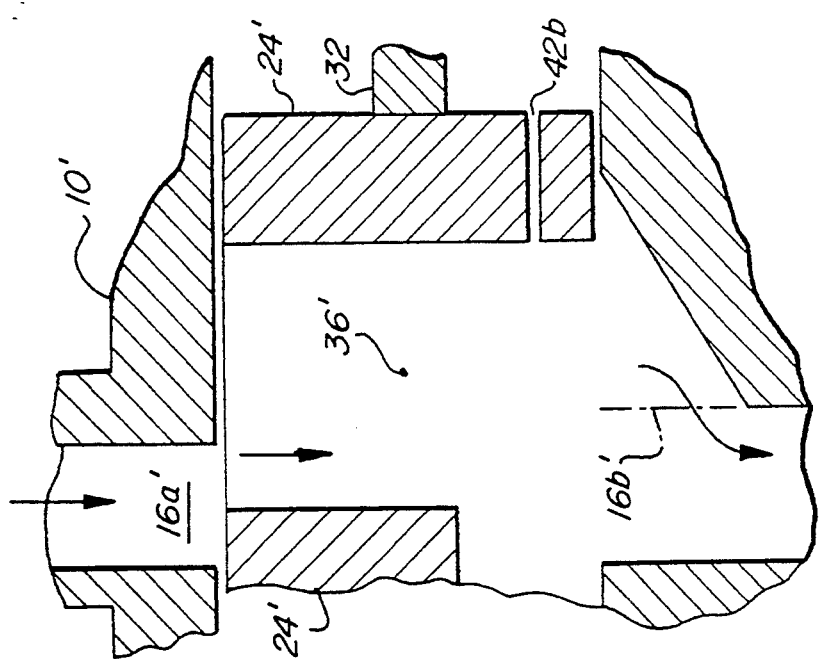
FIG. 8C is a schematic view of a valve generally corresponding to that of FIG. 8A showing another embodiment of the invention.
Figure 8A:
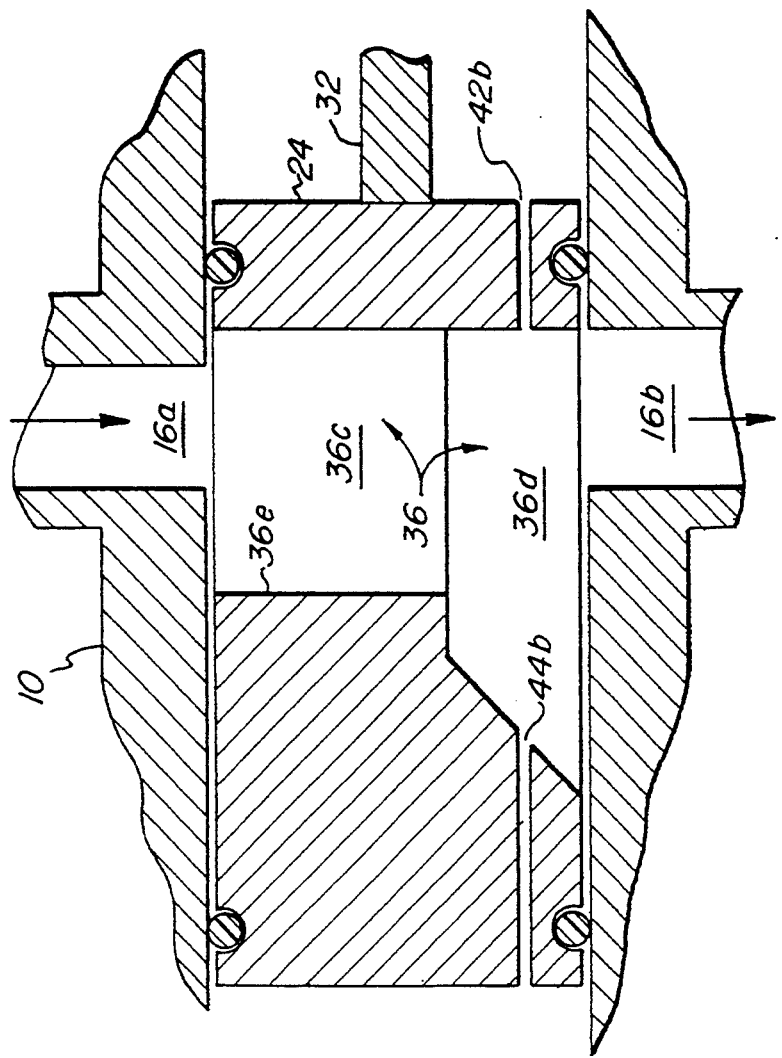
FIG. 8A is a semi-schematic cross-sectional view in elevation of the valve of FIG. 7, with parts omitted.

In the operation of a full stroke embodiment of the present invention, with plug member 24 slidably mounted within valve body 10 and the right hand end of slide chamber 12 closed by end seal 46, shaft 32 is moved to position plug member 24 at any selected position along its travel path within valve body 10. In order to fully open the valve, plug member 24 is positioned so that base portion 36a of flow orifice 36 is aligned congruently with the circular portion of inlet passage 16a of flow passageway 16 whereby plug member 24 does not constrict or impede the flow through flow passageway 16 and the valve is in its fully open position. FIGS. 7A-7C illustrate the relative positions, as would be sensed in a top plan view of the valve assembly of FIG. 7, of plug member 24 and inlet segment 36c of flow orifice 36 thereof to flow passageway 16 (as viewed from inlet passage 16a, the operations of inlet segment 36c which are shielded from view by valve body 10 are illustrated by dashed-line FIGS. 7A-7C). FIGS. 7A and 8A show the fully registered position of flow orifice 36 with inlet passage 16a which provides full-open flow through the valve. The elements of FIG. 8A are numbered to correspond to those of FIGS. 1-7 and so additional description of them is not necessary. In the preferred embodiment illustrated and as best shown in FIGS. 7A and 8A, the inside diameter of truncated inlet passage 16a is equal to the inside diameter of the circular arc forming base portion 36a of inlet segment 36c of flow orifice 36.

The valve characteristic curves of FIGS. 11, 12, 13 and 14 are described by the following mathematical relationships, which apply to both flow characteristics and flow area characteristics. For a linear characteristic curve the equation is:

$$y = ax + b$$

wherein the constant a is unity and the constant b is zero. For a valve having a particular flow or area characteristic, the unit sensitivity at a given setting is the reciprocal of the derivative of the equation describing its characteristic curve, divided by the given flow or flow area at that setting. Mathematically, this may be expressed as $$US = \frac{100(dx/dy)}{x}$$

wherein US stands for unit sensitivity in this and in the equations below.

In the case of the linear characteristic curve, this relationship yields the equation $$US = 100/x.$$

For the logarithmic characteristic of valves in accordance with the present invention the characteristic equation is $$y = ax^b$$

wherein, for the solids flow characteristic curve, the constant a=9.5848 and the constant b=0.5057. The unit sensitivity of a logarithmic characteristic valve is given by the equation $$US = (100/ba)x^{-b}.$$

For equal percentage characteristic valves the characteristic equation is $$x = ae^{by}$$

wherein a=2.03197 and b=0.03896. The unit sensitivity of an equal percentage characteristic valve is given by the equation $$US = 100b.$$

The equations given above may be used to define valve operation for valves of the three described types of characteristics; calculated values are given in TABLE I.

TABLE I

| % of Max. Lift | % of Max. Flow | Unit Sensitivity |
|---|---|---|
| A. Equal Percentage Flow Characteristic | | |
| 10.0 | 3.0 | 3.9 |
| 30.0 | 6.5 | 3.9 |
| 50.0 | 14.3 | 3.9 |
| 70.0 | 31.1 | 3.9 |
| 90.9 | 70.0 | 3.9 |
| B. Logarithmic Flow Characteristic | | |
| 10.0 | 1.088 | 19.8 |
| 30.0 | 9.6 | 6.57 |
| 50.0 | 26.9 | 3.9 |
| 70.0 | 51.0 | 2.8 |
| 77.1 | 70.0 | 2.4 |
| C. Linear Flow Characteristic | | |
| 10.0 | 10.0 | 10.0 |
| 30.0 | 30.0 | 3.3 |
| 50.0 | 50.0 | 2.0 |
| 70.0 | 70.0 | 1.4 |

Rangeability as previously defined is obtained by dividing 70% of maximum flow, i.e., the design capacity flow, by the percent of maximum flow corresponding to 10% of maximum lift. Area rangeability as previously defined is obtained by dividing 75% of maximum area, i.e., the design capacity of flow area, by the percent of maximum area corresponding to 10% of maximum lift. By so doing, the rangeability of valves having one of the flow characteristics set forth in TABLE I is calculated as shown in TABLE II.

TABLE II

| Flow Characteristic | Calculation | Rangeability |
|---|---|---|
| A. Equal Percentage | $\frac{70.0}{3.0}$ | 23.3 |
| B. Logarithmic | $\frac{70.0}{1.088}$ | 64.3 |
| C. Linear | $\frac{70.0}{10.0}$ | 7.0 |

As shown by the calculations of TABLE II, logarithmic characteristic valves in accordance with the present invention exhibit a rangeability about two and three-quarters greater than that of equal percentage flow characteristic valves and more than nine times greater than that of linear flow characteristic valves. Flow rangeability of valves designed in accordance with the present invention may vary from about 64.3 for full stroke operation to about 75 for limited stroke operation. The large rangeability of valves in accordance with the present invention provides a great advantage over conventional valves of either linear or equal percentage characteristics. For example, in a fluid catalytic cracking unit which is designed for alternate operation on high-metals content reduced crudes and low-metals content clean gas oil, the fresh catalyst make-up system must operate over an enormous range of continuous addition rates of fresh make-up catalyst to the unit. Utilization of a control or throttling valve in accordance with the present invention provides a valve of greatly enhanced rangeability as compared to conventional valves and therefore one which is capable of maintaining its desired valve characteristic over a much broader range of flow rates.

Figure 8B:
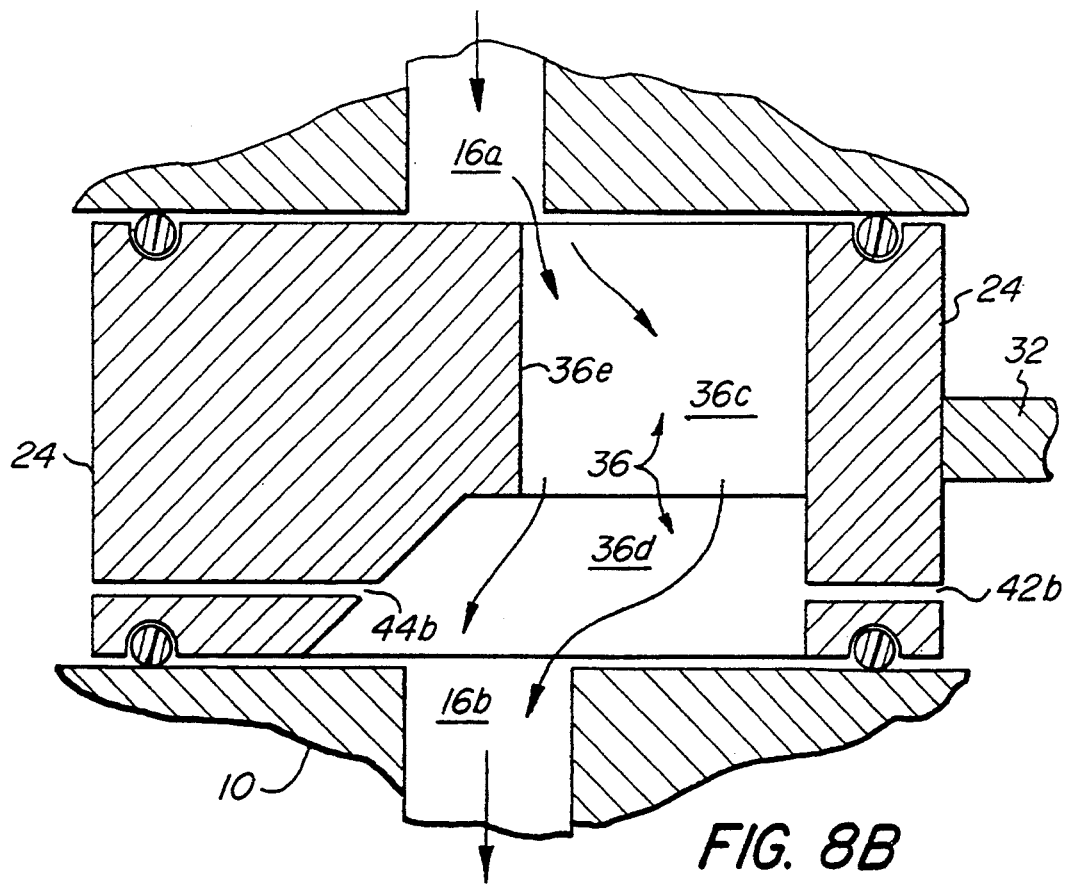
FIG. 8B is a view corresponding to that of FIG. 8A but showing the plug member in a different position within the plug chamber.

When it is desired to reduce the flow through the valve, plug member 24 is moved a selected distance rightwardly as sensed in FIGS. 1, 3 and 7, so as to move base portion 36a of orifice 36 partially out of register with inlet passage 16a, whereby a part or all of tapered slot portion 36b of inlet segment 36c of flow orifice 36 is registered with inlet passage 16a, and thereby constricts the available opening for flow of material through inlet passage 16a. Due to the truncated circle configuration of inlet passage 16a, movement of plug member 24, at least in the initial stages of movement, varies the triangular cross-sectional flow area of the valve. The relative positions of flow passageway 16 and inlet segment 36c of orifice 36, when the valve is in a throttling position, are illustrated in FIGS. 7B and 8B. This places the valve in a partially open or reduced flow position.

As best shown in FIGS. 7 and 8B, the configuration of outlet segment 36d of flow orifice 36 is seen to be dimensioned and configured to provide a cross-sectional flow area from outlet segment 36d into outlet passage 16b which at all positions from full open to closed, is as large as, or larger than, the cross-sectional flow area of inlet segment 36c. Generally, outlet segment 36d of flow orifice 36 extends leftwardly (as viewed in FIGS. 7 and 8B) beyond inlet segment 36c, so that, at any position of plug member 24, the flow of solids or other material into outlet 16b is not impeded, as described in more detail below. In the embodiment illustrated in FIG. 8A (and in FIGS. 3, 4, 5, and 6) this feature is obtained by expanding outlet segment 36d leftwardly (as viewed in FIGS. 4 and 8A) to maintain a suitable cross-sectional flow area at all operating positions of plug member 24 within valve body 10. The same effect of avoiding a choke point or bottleneck within flow orifice 36 can be attained with a flow orifice which does not have an outlet segment of expanded cross section, e.g., a flow orifice of constant cross section, by utilization of a properly dimensioned and configured outlet passage 16b', as illustrated in FIG. 8C. In FIG. 8C, a valve body 10' has an inlet passage 16a' and an outlet passage 16b', and has a plug member 24' slidably mounted therein. Plug member 24' has a flow orifice 36' of constant cross-sectional area and of any suitable cross-sectional configuration, e.g., ovoid, circular, or the like. Outlet passage 16b' is dimensioned and configured to be expanded rightwardly as viewed in FIG. 8C so that, with the plug member 24' in any operating position, the cross-sectional area for flow from flow orifice 36' into outlet passage 16b' is at least as great as that through flow orifice 36'. Note that if the configuration of flow orifice 36' were used in conjunction with a non-expanded outlet passage, the configuration of which is indicated by the dotted lines in FIG. 8C, the flow path through flow orifice 36' would be "bottlenecked" at the outlet from flow orifice 36' into outlet passage 16b' which could result in the solid particulates clogging flow orifice 36' and plugging the valve.

As plug member 24 is moved further rightwardly relative to valve body 10 (as viewed in FIGS. 1–3, 8A and 8B) the narrower segment of tapered slot portion 36b of orifice 36 advances across inlet passage 16a, further constricting flow. When apex 36e of tapered slot portion 36b contacts or clears the right hand (as viewed in FIGS. 1–3, 8A and 8B) portion of inlet passage 16a, the valve is in its fully closed position. The relative positions of inlet passage 16a and inlet segment 36c of orifice 36, when the valve is in its fully closed position, are illustrated in FIG. 7C. It will be appreciated that plug member 24 may be placed in any selected intermediate position thus providing extremely small increments of position between (and including) the full-open position illustrated in FIGS. 7A and 8A and the fully closed or shut-off position illustrated in FIG. 7C. By dimensioning the flow orifice and the inlet passage as described in detail with respect to FIG. 3A or 3B, enhanced rangeability and the unique logarithmic flow characteristic of valves in accordance with the present invention are obtained. The circular arc portion of the flow passageway adjacent to the ovoid-shaped flow orifice is preferably of the same diameter as the circular arc base portion of the ovoid-shaped orifice.

In the foregoing descriptions of various embodiments of the invention, the flow orifice in the plug member was defined at least in part by a tapered slot portion and the inlet passage of the valve was defined at least in part by a substantially straight leading edge disposed substantially perpendicular to the direction of travel of the plug member, so that as the plug member travelled from a fully closed position to an intermediate throttling position, the legs of the tapered slot portion first intersect the leading edge of the inlet passage. However, in other embodiments of the present invention, the configurations of the inlet passage and of the pertinent portion of the flow orifice of the plug member may be reversed. Thus, the flow orifice may have a peripheral shape defined part by a substantially straight leading edge disposed substantially perpendicular to the direction of travel of the plug member, and the inlet passage may be configured to have a peripheral shape defined at least in part by a tapered slot portion oriented so that as the plug member moves from a fully closed position to an intermediate throttling position, the leading edge of the flow orifice is first intersected by the apex of the tapered slot portion of the inlet passage.

The area rangeability of a valve having a flow orifice with either a rectangular or arcuate base portion, as described above, is dependent upon the included angle of the tapered slot portion. To determine the included angles which provide the most favorable area rangeability, a log-log plot of the percent of maximum lift versus the corresponding percent of maximum flow area for orifices having various included angles of tapered slot portions was prepared and is shown in FIG. 14. The plotted curves were produced by calculating, for several different apex angles, the actual flow cross-sectional area as a function of lift. The curves may then be used to calculate the area rangeabilities for the respective apex angles by determining the point along the abscissa corresponding to 10% of maximum lift. Values of area rangeability for a variety of included angles derived from FIG. 14 are set forth in TABLE III. As previously noted, area rangeability is calculated by dividing 75% of maximum area by the percent area corresponding to 10 percent lift.

TABLE III

| Apex Angle | % of Max Area at 10% Stroke | Calculated Area Rangeability |
|---|---|---|
| 90° | 1.45 | 75/1.45 = 51.7 |
| 75° | 1.45 | 51.7 |
| 60° | 1.45 | 51.7 |
| 45° | 1.56 | 75/1.56 = 48.1 |
| 30° | 2.05 | 75/2.05 = 36.6 |

The data in TABLE III clearly show that angles between 45° and 90° have area rangeabilities significantly greater than angles of 30°. Area rangeability reaches a maximum of about 51.7 for apex angles of about 60° to 90°. This result is in contrast with the teachings of the prior art, particularly those of Kocanowski in U.S. Pat. No. 4,471,942, who taught that the "accurate control range (i.e., rangeability or area rangeability) is extended as (apex angle) B is decreased." See column 8, lines 63–64 of the Kocanowski patent. The difference in these conclusions may be due to the fact that the flow port of a valve according to the present invention may be opened to the full area of the inlet passage, thus resulting in unconstricted flow through the valve, in direct contradistinction to the valve taught by Kocanowski, which may not be opened to such an extent.

In limited stroke embodiments of the invention described above, in which the cross-sectional flow area of the flow passageway is triangular at all times during normal operation, it can be seen that the valve will normally have an area rangeability of 75. (The flow rangeability will also be about 75, because for these relatively small openings the coefficient of discharge remains constant at $C_d = 0.6$.) This can be demonstrated as follows: consider a flow orifice and an inlet passage that cooperate to form a flow passageway having a triangular cross-sectional flow area as depicted in FIG. 3E. At the maximum stroke at which the cross-sectional flow area remains triangular, the triangle has a maximum height H and a maximum base B, so that the maximum cross-sectional flow area of the valve is equal to $\frac{1}{2}(B * H)$. At intermediate throttling positions between the fully open position and the fully closed position, the degree of stroke can be given as X, and at each such position the height of the triangle will be equal to X, H and the base of the triangle will be equal to X * B, wherein X indicates a fraction of the full stroke. Therefore, the cross-sectional flow area of the flow passageway at an intermediate throttling position defined by stroke X will be equal to $X^2 * \frac{1}{2}(B * H)$. In a particular instance, at 50% stroke, the cross-sectional flow area of the flow passageway will be $(0.5)^2 \frac{1}{2}(B * H)$. Applying this information to the definition of area rangeability, one divides 75% of the maximum area, i.e., $(0.75) \frac{1}{2}(B * H)$, by the percent area corresponding to 10% lift, i.e., $(0.10)^2 \frac{1}{2}(B * H)$, yielding an area rangeability of 75. FIG. 14 includes the area rangeability curve corresponding to the limited stroke embodiment.

As the valve of the invention is well adapted to handle abrasive particulate materials, inlet segment 36c of flow orifice 36 is subjected to extensive wear, particularly at and adjacent the apex 36e during partially open/reduced flow operation. Hard facing material 40 helps to resist this wear and prolong the life of the valve but, more significantly, because the length L (FIG. 4) of the flow orifice inlet segment 36c is large, for example, it may have a length of about 5.1 cm (about 2 inches), a large amount of material may be worn away without affecting the effective flow throttling dimensions or performance of the valve. For example, even if the material wears away to the extent indicated by the dotted wear lines W or W' shown in FIG. 4, the remaining unworn portion U of apex 36e (and the area adjacent the apex) of flow orifice 36 serves to constrict the flow through inlet passage 16a to precisely the same extent as was done prior to any wear being sustained by flow orifice 36. Accordingly, it is seen that a large amount of plug material may be worn away and yet the effective throttling performance and shut-off ability of the valve will remain unchanged simply by moving plug member 24 further to the right for any given setting, by an amount which compensates for the amount of wear.

Before inlet segment 36c of orifice 36 shows appreciable wear, the shut-off position of FIG. 7C may be attained when the right hand end 24r (as viewed in FIG. 7) of plug member 24 is at position $C_n$ (FIG. 1). When inlet segment 36c has sustained wear to the extent shown by wear line W' in FIG. 4, right hand end 24r of plug member 24 will have to be positioned at position $C_w$ (FIG. 1) in order to fully close the valve. The fully-open position of end 24r of plug member 24 is shown at position O in FIG. 1. Any wear sustained by base portion 36a of inlet segment 36c of orifice 36 (such wear will be minimal due to the fact that base portion 36a is congruent with passageway 16) should not adversely affect the performance of the valve.

Figure 8D:
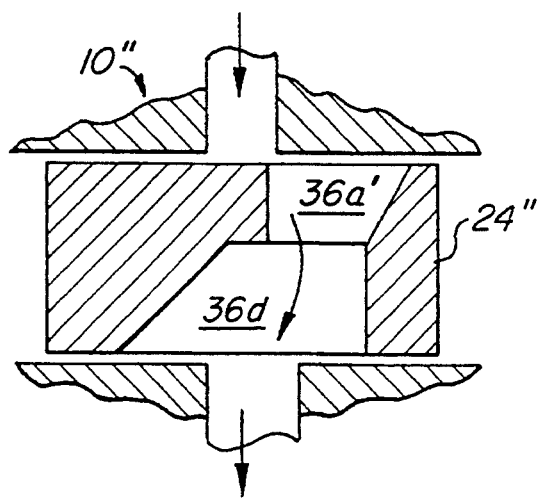
FIG. 8D is a view similar to that of FIG. 8C but on a reduced scale showing yet another embodiment of the invention.

Obviously, numerous variations within the scope of the invention may be made to the specific design of the preferred embodiment illustrated in the figures. For example, in addition to the embodiment illustrated in FIG. 8C, the inlet segment of the flow orifice may be flared as illustrated in FIG. 8D. In this embodiment, outlet segment 36d of the flow orifice is similar to that of the embodiment of FIGS. 3–6, but inlet segment 36a' has a taper converging in the direction of flow therethrough. Fluidizing the particulate solids in the expanded cross section of outlet segment 36d (FIGS. 4 and 7) helps to insure smooth passage through the valve and to avoid clogging of the material. Further, the fluidizing gas insures that the bottom of plug member 24, on both sides of outlet segment 36d, will always be moving against a fluidized bed (mass) of solids when the position of plug member 24 is changed, rather than against a packed mass of solids thereby preventing or at least reducing the likelihood of the outlet side of the valve jamming with solids. This is attained by flowing a fluidizing gas through fluidizing gas inlet passages 42a–c and 44a–c across outlet segment 36d of flow orifice 36. In the embodiment illustrated, the fluidizing gas may then pass with purge gas through outlet passage 16b with the solids. In the embodiment illustrated in the figures, the fluidizing gas is provided by a portion of the purge gas which is introduced via purge gas inlets 14 and 18. The fluidizing gas portion of the purge gas passes through fluidizing gas inlet passages 42a–c and 44a–c.

The total length (L plus $l_d$) of flow orifice 36, i.e., the diameter of plug member 24 in the illustrated embodiment, is greater than the diameter of either the circular portion of inlet passage 16a or outlet passage 16b. The length L of inlet segment 36c of plug member 24 is of substantial thickness and is preferably at least one-fifth, more preferably at least one-third, of the diameter of inlet passage 16a which, in the embodiment illustrated, is the same as that of outlet passage 16b. In any event, the length L is desirably sufficiently large, for example, about 1.3 to about 5 cm (about 0.5 to about 2 inches or more) to permit a substantial amount of wear of the flow orifice without affecting the effective throttling and shut-off capabilities provided by inlet segment 36c of flow orifice 36.

As used herein, and in the claims, "registration" or "register" of the flow orifice with respect to the flow passageway simply means alignment of the flow orifice with respect to the flow passageway. When the flow orifice is stated to be "out of registration", "out of register" or "not registered" with the flow passageway, it simply means that the flow passageway is entirely closed or blocked by the plug member (as illustrated in FIG. 7C). When the flow orifice is stated to be "registered" or "in registration" with the flow passageway, the flow passageway is either fully open (FIGS. 7A and 8A, showing the flow orifice "fully registered" with the flow passageway) only partially open (FIGS. 7B and 8B, showing the flow orifice "partially registered" with the flow passageway). Flow orifice 36, when registered with inlet and outlet passages 16a and 16b, completes and opens flow passageway 16.

The purge gas is introduced via purge gas inlets 14 and 18 under sufficient pressure upstream of annular seal rings 30a and 30b to provide a desired seal ring pressure drop. Slide chamber 12 and plug member 24 and its annular seal rings 30a and 30b are all dimensioned and configured to force purge gas past annular seal rings 30a and 30b flow along the annular space between plug member 24 and interior walls 13 of slide chamber 12 and out via outlet passage 16b. The purge gas tends to sweep solid particles which might otherwise become trapped in the annular space between plug member 24 and wall 13 of slide chamber 12, thereby tending to wear the valve and cause sticking of plug member 24.

In summary, the valves of the present invention are especially well-suited for controlling the flow of fine particulate solids, whether dry or as slurries of such solids in liquid media. The valves of the present invention provide significant advantages, including enhanced rangeability. In certain embodiments the valves of the present invention provide the ability to sustain extensive wear without affecting the flow controlling and shut-off abilities, rangeability or flow characteristic. The expanded cross section outlet segment of the flow orifice of certain embodiments provides an outlet flow area which is equal to or greater than the cross-sectional flow areas of both the inlet passage (16a in the illustrated embodiments) and the inlet segment (36c in the illustrated embodiments) of the flow orifice at all flow settings, thereby helping to avoid clogging of solids. Further, both full shut-off and all the pressure drop for control of solids flow always take place at the inlet side of the plug member, so that the valve acts as a single-seated valve, not as a double-seated valve in which solids could pack between the dual seats. Further, the flow orifice of the plug member is designed so that, as illustrated in FIGS. 7A and 8A, upon full opening of the valve, the flow passageway is not reduced by the plug member whereby the valve has full line size opening capability.

As mentioned above, the length of the flow orifice (illustrated by the sum of the dimensions L and l in FIG. 4), which generally equals the diameter of the plug member, is greater than the diameter of the circular portion of flow passageway (illustrated by the dimension D in FIG. 3D). In preferred embodiments of the invention well adapted for the control of particulate solids flow, e.g., the flow of fluidized solid catalyst particles for fluid catalytic cracking of petroleum feedstocks, the length of the flow orifice $(L+l_d)$ is at least about 2 inches (5.1 cm) greater than the inside diameter (D) of the flow passageway. Typically, for a nominal 1.5 inch (3.8 cm) valve, D=1.100 inches (2.79 cm) and $(L+l_d)$=3.162 inches (8.03 cm). For a nominal 3 inch (7.62 cm) valve, D=2.300 inches (5.84 cm) and $(L+l_d)$=4.362 inches (11.08 cm), and for a nominal 6 inch (15.24 cm) valve, D=5.761 inches (14.63 cm) and $(L+l_d)$=7.823 inches (19.87 cm).

The valve or parts thereof may of course be thermally insulated and/or lined or otherwise comprised of a wear- and/or heat-resistant material. For example, external insulation about the valve body may be used to facilitate the plug member and the valve body attaining the same temperature in high temperature service so as to minimize differential thermal expansion.

The valve may be made of any suitable metal of construction, including stainless steel, and may include ceramic or other coatings and components. For example, stainless steel does not have good erosion resistance at high temperatures. Therefore, in one embodiment, a stainless steel valve may be configured so that the inlet and outlet passages of the steel valve body and the flow orifice of the steel plug member are made oversized relative to the rest of the valve and then lined with an appropriate thickness of an erosion-resistant material.

Referring now to FIG. 9, there is shown a valve body 10' comprising an embodiment of the invention in which outlet passage 16b' has an enlarged cross-sectional entry end 216 which is generally wedge-shaped. Entry end 216 is defined by a pair of opposing sloping sidewalls 220, 222, wide longitudinal opening 224 into the slide chamber 212 and a narrow throat 226. Throat 226 leads into the remainder of outlet passage 16b'. Sidewalls 220, 222 define an angle a with longitudinal wall 213 of slide chamber 212. Angle a may vary and may be as large as 60°, say, about 1° to 60°, preferably about 25° to 35°, e.g., 30°, in order to provide a generally V-shaped, funnel-like opening from slide chamber 212 to outlet passage 16b'. A plug member (not shown in FIG. 10) similar to that illustrated in FIGS. 3 and 4 or FIGS. 8A and 8B may be mounted within valve body 10' as described above with respect to other embodiments of the invention. Because of the enlarged configuration of entry end 216, the plug member (not shown) utilized in the FIG. 9 embodiment is relatively longer than those of the other illustrated embodiments so as to enable the plug member to fully bridge enlarged entry end 216 at all operating positions of the valve. Valve body 10' of FIG. 9 is also relatively longer so as to accommodate the longer plug member. The enlarged entry end 216 facilitates the handling of coarser, non-fluidizable or non-fluidized solids. With the valve mounted with the longitudinal axis of slide chamber 212 positioned horizontally, coarse particles will tend to flow by gravity through enlarged entry end 216. For most coarse, non-fluidizable solids, an angle a of about 30°, say 25° to 35°, will be satisfactory. Any suitable design plug member may be used with a valve body having an enlarged entry end of the outlet passage as illustrated in FIG. 10. Although well adapted for handling coarse size particles, e.g., one-quarter to one-inch diameter particles or larger, the enlarged entry end embodiment is also well-suited to handle fine solid particles, whether fluidized or not. Other than the increased thickness of the bottom (as viewed in FIG. 9) of valve body 10', valve body 10' is generally similar to that of valve body 10 of FIG. 1, having an inlet passage 16a' and purge gas inlets 214, 218, with one end of chamber 212 having an end wall 215. Description of other details of valve body 10' are omitted as they are generally similar to those of valve body 10.

Figure 10A:
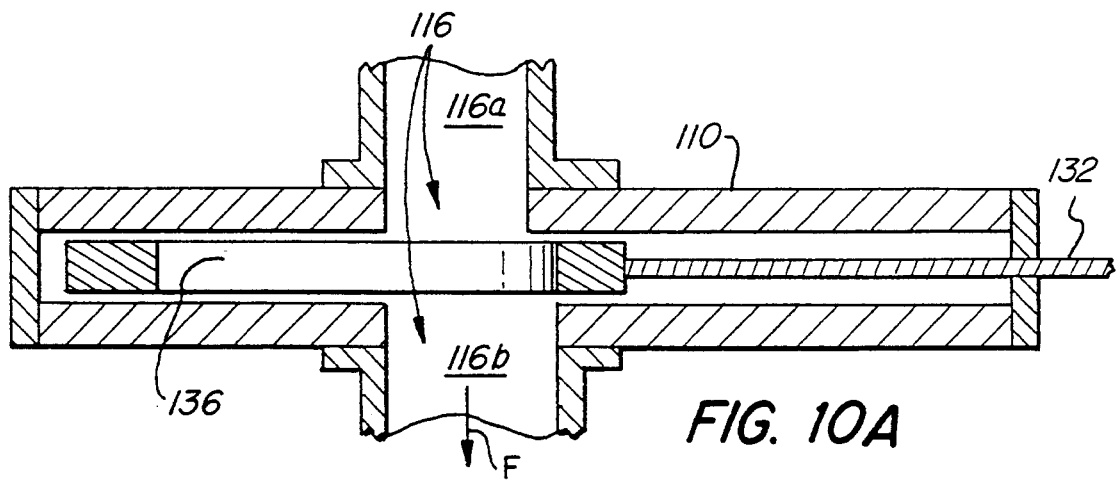
FIG. 10A is a cross-sectional schematic view in elevation of another embodiment of the invention utilizing a plate-like plug member.
Figure 10B:
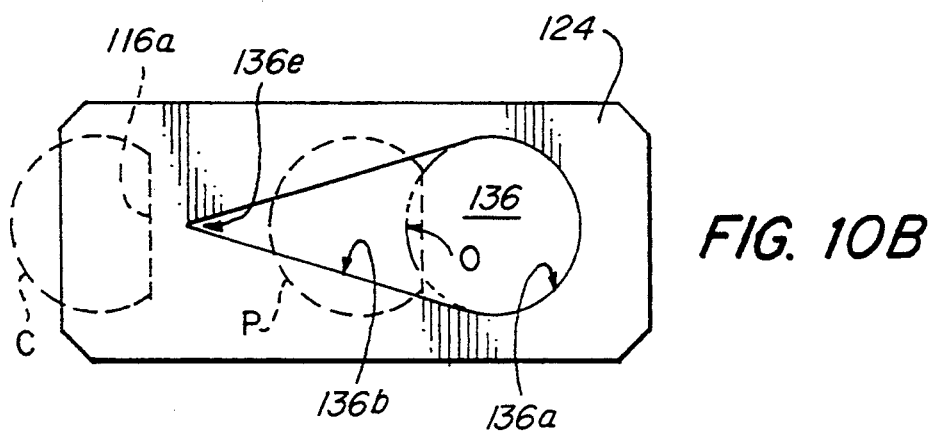
FIG. 10B is a plan view of the plate-like plug member of the FIG. 10A embodiment showing an ovoidal flow orifice.
Figure 10C:
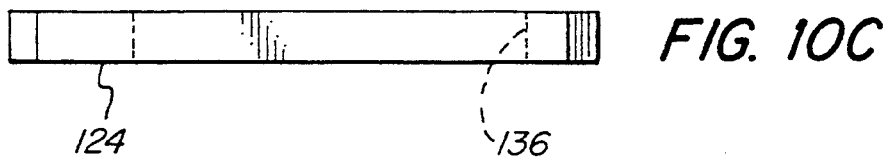
FIG. 10C is a side elevational view of the plug member of FIG. 10B.

Referring now to FIGS. 10A, 10B, and 10C, there is shown another embodiment of the present invention which is similar to that of the FIGS. 1-7 embodiment, except that the plug member 124 is of flat, plate-like construction. Plug member 124 has a flow orifice 136 which is of ovoid construction, extends through the major surfaces of plug member 124 and has a uniform cross-sectional configuration. The valve body 110 has an inlet passage 116a and an outlet passage 116b which cooperate to partially define a flow passage when flow orifice 136 is registered therewith to open the valve to flow therethrough in the direction indicated by the arrow F in FIG. 10A.

Plug member 124 is mounted for movement within a slide chamber (unnumbered) formed within valve body 110 and has positioning means comprising a shaft 132 attached thereto to selectively adjust the position of plug member 124 within valve body 110.

As best seen in FIG. 10B, orifice 136 (which is not drawn to scale) comprises a circular arc base portion 136a and a tapered slot portion 136b which terminate in an apex 136e. As with inlet segment 36c of the FIGS. 1-7 embodiment, the angle subtended by apex 136e of tapered slot portion 136b is from about 45 degrees and may be from 55 to 65 degrees, preferably about 60 degrees, and the legs defining tapered slot portion 136b are of equal length and tangential to dotted line imaginary circle O. Preferably, the periphery of base portion 136a is correspondingly coincident with about 240 degrees of circle O. Inlet passage 116a is of circular cross section and has a diameter (inside diameter) substantially equal to that of circle O. Inlet and outlet passages 116a and 116b are coaxially aligned and both are of equal, circular cross section.

The dotted-line circle O, and truncated circles P and C in FIG. 10B show the relative positions of inlet passage 116a, outlet passage 116b and flow orifice 136. In the illustrated embodiment, the circular portion of truncated inlet passage 116a has the same diameter as outlet passage 116b, but the latter diameter can, of course, be larger.

When plug member 124 is positioned to fully align inlet passage 116a with the base portion of flow orifice 136 as illustrated by dotted-line circle 0, the valve is fully open and provides the capability of full line opening flow therethrough. When plug member 124 is positioned so that the relative position of inlet passage 116a to flow orifice 136 is shown by dotted-line circle P, the valve is partially open. Similarly, with plug member 124 positioned so that the relative position of inlet passage 116a to flow orifice 136 is shown by dotted line circle C, the valve is fully closed. As described above with respect to the embodiment of FIGS. 1-7, plug member 124 may be moved in extremely small increments and retained at a selected location to provide any desired intermediate setting from and including full open, partially open, and full closed. At any and all such settings, by appropriately sizing flow passageway 116 and sizing flow orifice 136 as described above in accordance with the description of FIG. 3A, a valve of enhanced rangeability and exhibiting the logarithmic area characteristic described above is obtained. Details of construction of the valve of FIGS. 10A–10C, such as a stop to limit leftward (as viewed in FIG. 10A) movement, etc., are omitted as such may generally be similar to those described in detail with respect to the FIGS. 1-7 embodiment.

Figure 10D:
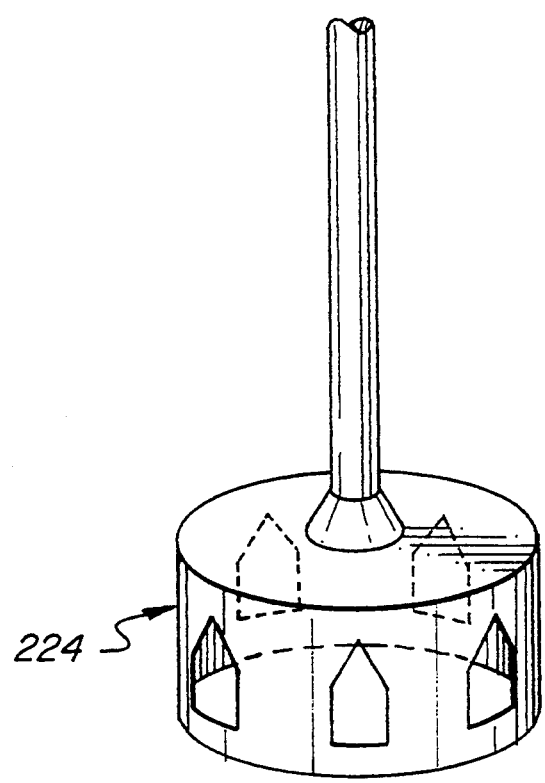
FIG. 10D is a perspective view of a plug member having a plurality of flow orifices therein according to another embodiment of the invention.

In yet another alternative embodiment of the present invention, the plug member may be equipped with a plurality of flow orifices. Thus, as illustrated in FIG. 10D, plug member 224 may comprise a series of flow orifices 36" arranged in parallel. As illustrated, each of flow orifices 36" has a periphery comprising a tapered slot portion and a base portion, as previously described. Ordinarily, all the orifices will be identical. The plug member 224 moves axially within a surrounding concentric solid collar (not shown) which forms the seat of the valve. As previously noted, a limited stroke embodiment may be used to provide a plurality of simple triangular flow paths yielding an area rangeability of 75.

While the invention has been described with respect to specific preferred embodiments thereof, it will be appreciated that upon a reading and an understanding of the foregoing, variations thereto may well occur to those skilled in the art and it is intended to include all variations within the scope of the following claims.

What is claimed is:

1. A control valve comprising (a) a valve body having a slide chamber therein and an inlet passage and an outlet passage cooperating to partially define a flow passageway intersecting the slide chamber; (b) a plug member mounted for movement within the slide chamber and having an elongated flow orifice extending transversely therethrough, the plug member and its flow orifice being each dimensioned and configured to seal the flow passageway when the flow orifice is out of register with the inlet passage and to complete the flow passageway by connecting the inlet and outlet passages in flow communication when the flow orifice is registered therewith; and (c) positioning means operatively connected to the plug member to position the plug member at selected locations within the slide chamber to selectively adjust registration of the flow orifice with the inlet and outlet passages, the flow orifice and inlet passage being respectively dimensioned and configured to provide a flow area characteristic such that a plot of percentage lift on the ordinate versus percentage flow area as the abscissa on log-log coordinates defines a substantially straight line of positive slope;

wherein one of the inlet passage and the flow orifice is defined by a first peripheral shape comprising (i) a substantially straight leading edge disposed substantially perpendicular to the direction of travel of the plug member and (if) a closure periphery, and the other is defined by a second peripheral shape comprising a tapered slot portion defined by substantially straight legs, the tapered slot portion being not greater in width than the length of said leading edge over at least a majority of the length of the tapered slot portion, the tapered slot portion being positioned so that as the plug member moves from a fully closed position to intermediate throttling positions, the legs of the tapered slot portion first transect the first peripheral shape at the leading edge thereof, whereby to define, for at least a portion of the travel of the plug member, a flow passageway having a triangular cross-sectional flow area; and wherein said first peripheral shape defines an area greater than the area defined by the legs of the tapered slot portion, and wherein said second peripheral shape comprises a base portion associated with the tapered slot portion and is dimensioned and configured so that when the flow orifice is fully registered with the inlet passage, the valve is substantially fully open to flow therethrough.

2. The valve of claim 1 wherein the first peripheral shape is configured as a truncated circle comprising the leading edge and a circular arc portion, and wherein the second peripheral shape is of ovoid cross section in that the base portion associated with the tapered slot portion has a cross-sectional flow area which defines an arc of a circle of a diameter at least as great as the diameter of the circular arc portion of the first peripheral shape so that when the base portion of the second peripheral shape is fully registered with the first peripheral shape, the valve is substantially open to flow therethrough.

3. The valve of claim 2 wherein the base portion associated with the tapered slot portion of the second peripheral shape is congruent with the circular arc portion of the first peripheral shape.

4. The valve of claim 2 wherein the inlet passage is defined by the first peripheral shape comprising the leading edge and the flow orifice is defined by the second peripheral shape comprising the tapered slot portion.

5. The valve of claim 4 wherein the tapered slot portion has in flow cross section the shape of the legs of an isosceles triangle and the associated base portion has the shape of an arc of a circle subtending from about 225 to about 270 degrees, the legs of the triangle defining at their apex ends an angle of from about 45 to 90 degrees and respectively extending one to each opposite end of the circular arc.

6. The valve of claim 5 wherein the circular arc of the base portion subtends from about 235 to about 245 degrees and the legs of the isocelese triangle define at their apex ends an angle of from about 55 to 65 degrees and respectively extend one to each opposite end of the circular arc.

7. The valve of claim 6 wherein the angle defined at the apex of the isosceles triangle is about 60 degrees and the arc subtends about 240 degrees.

8. The valve of claim 4 wherein the tapered slot portion has in flow cross section the shape of the legs of a triangle having an imaginary base, the legs defining at their apex an angle of from about 45 to 90 degrees, and wherein the associated base portion has the shape of an open-sided rectangle, the imaginary base of the triangle coinciding with the open side of the rectangle.

9. The valve of claim 8 wherein the legs of the triangle define at their apex ends an angle of from about 55 to 65 degrees.

10. The valve of claim 9 wherein the legs of the triangle define at their apex ends an angle of about 60 degrees.

11. The valve of claim 8 wherein the triangle is an isosceles triangle.

12. The valve of claim 8 wherein the rectangle has a width approximately equal to the width of the inlet passage.

13. The valve of claim 1 wherein the inlet passage is defined by the second peripheral shape comprising the tapered slot portion and the flow orifice is defined by the first peripheral shape comprising the leading edge.

14. The valve of claim 1 or claim 2 having an area rangeability of about 51.7 based on a maximum flow obtained wherein the flow orifice is dimensioned and configured and may be positioned in normal operation so that the inlet passage is unobstructed.

15. The valve of claim 1 wherein the inlet and outlet passages are respectively located at radially opposite sides of the slide chamber.

16. The valve of claim 1, claim 4 or claim 7 wherein the flow orifice comprises an inlet segment facing the inlet passage of the flow passageway and an outlet segment facing the outlet passage of the flow passageway, and the cross-sectional area of the outlet segment is equal to or greater than the maximum cross-sectional area of the inlet segment.

17. The valve of claim 16 wherein the flow orifice is of constant cross-sectional shape.

18. The valve of claim 1 wherein the inlet passage and outlet passage are coaxial.

19. The valve of claim 1 wherein the slide chamber comprises a generally cylindrical bore and the plug member is of generally cylindrical configuration.

20. The valve of claim 1 wherein the first peripheral shape defines a rectangle comprising the leading edge.

21. The valve of claim 1 wherein the positioning means provides a limited stroke of the plug member in normal operation whereby the apex of the tapered slot portion does not extend beyond the closure periphery of the first peripheral shape.

22. A control valve comprising:
a valve body having therein a slide chamber and an inlet passage and an outlet passage at respective opposite sides of the chamber, the inlet passage having a cross-sectional flow area defined by a peripheral shape comprising a substantially straight leading edge disposed substantially perpendicular to the direction of travel of the plug member defined below and a closure periphery, the inlet and outlet passages cooperating to partially define a flow passageway intersecting the slide chamber;
a plug member mounted for movement within the slide chamber and having a flow orifice extending transversely therethrough, the plug member and its flow orifice being each dimensioned and configured to seal the flow passageway when the flow orifice is out of registration with the flow passageway and to complete the flow passageway by connecting the inlet and outlet passages in flow communication when the flow orifice is registered therewith, at least a segment of the flow orifice being dimensioned and configured to comprise a tapered slot portion with a cross-sectional flow area less than that of the flow passageway, the tapered slot portion (a) having in flow cross section the shape of an isosceles triangle, the legs of which subtend at their apex ends an angle of from about 45 to 90 degrees, and (b) being narrower than the width of the flow passageway over at least a majority of its length and defining a triangular cross-sectional area smaller that that of the inlet passage; the tapered slot portion of the flow orifice and the inlet passage being dimensioned and configured so that as the plug member moves from a fully closed position to an intermediate throttling position, the legs of the isosceles triangle first transect the inlet passage at the leading edge thereof whereby to define, for a portion of the travel of the plug member, a flow passageway having a triangular cross-sectional flow area, the flow orifice further having an associated base portion with a cross-sectional flow area at least as wide as the cross-sectional flow area of the flow passageway, and being dimensioned and configured so that when the base portion is fully registered with the flow passageway, the valve is fully open to flow therethrough and when the tapered slot portion or part thereof is registered with the flow passageway, the valve is partially open for flow therethrough; and positioning means operatively connected to the plug member to position the plug member at selected incremental locations within the slide chamber to selectively adjust registration of the flow orifice with the inlet and outlet passages at fully open, fully closed and a plurality of intermediate throttling positions.

23. The valve of claim 22 wherein the base portion has a circular arc cross-sectional flow area which defines from about 225 to about 270 degees of an arc of a circle of a diameter at least as great as the effective diameter of the flow passageway, and the legs of the isosceles triangle in the tapered slot portion define at their apex ends an angle of from about 45 to 90 degrees and extend one to each respective end of the arc.

24. The valve of claim 23 wherein the base portion has a circular arc cross-sectional flow area which defines from about 235 to about 245 degees of an arc of a circle of a diameter at least as great as the effective diameter of the flow passageway, and the legs of the isosceles triangle in the tapered slot portion define at their apex ends an angle of from about 55 to 65 degrees and extend one to each respective end of the arc.

25. The valve of claim 22 wherein the flow orifice comprises an inlet segment configured to have a base portion with a cross-sectional flow area which defines an arc of a circle of a diameter at least as great as the effective diameter of the flow passageway and wherein at least a portion of the inlet passage is of circular cross section and of an effective diameter substantially the same as the diameter of the circular arc of the base portion of the flow orifice.

26. The valve of claim 22 wherein the flow orifice comprises an inlet segment configured to have a base portion with a cross-sectional flow area which defines three sides of a rectangle having a width at least as great as the effective diameter of the flow passageway.

27. The valve of claim 22 or claim 25 wherein the legs of the tapered slot portion define at their apex ends an angle of from about 60 to 75 degrees.

28. The valve of claim 22 wherein the flow orifice is of constant cross-sectional shape.

29. The valve of claim 28 wherein the outlet passage is of circular cross section and of substantially the same effective diameter as the circular arc of the base portion of the flow orifice.

30. The valve of claim 1 or claim 22 wherein the flow orifice comprises an inlet segment facing the inlet passage and an outlet segment facing the outlet passage, and the cross-sectional area of the outlet segment of the flow orifice is sufficiently greater than the cross-sectional area of the entry to the outlet passage whereby, at all operating positions of the plug member within the slide chamber, the outlet passage is unconstricted by the plug member.

31. The valve of claim 22 wherein the angle defined at the apex of the tapered slot portion is about 60 degrees.

32. The valve of claim 3 or claim 24 wherein the legs of the tapered slot portion are, at their ends opposite the apex ends, substantially tangential to the arc at the respective opposite ends of the arc.

33. The valve of claim 1 or claim 22 wherein the tapered slot portion has in flow cross section the shape of the legs of a triangle, the legs defining at their ends an angle of from about 45 to 90 degrees, and the associated base portion has the shape of an open-sided polygon,, the imaginary base of the triangle coinciding with the open side of the polygon.

34. The valve of claim 33 wherein the open-sided polygon is a rectangle.

35. The valve of claim 22 wherein the positioning means provides a limited stroke of the plug member in normal operation whereby the apex of the tapered slot portion does not extend beyond the closure periphery of the inlet passage and having an area rangeability of about 75, and a solids flow rangeability of about 75, based on a maximum flow area obtained wherein the apex coincides with the arc of the inlet passage.

36. The valve of claim 1 or claim 22 wherein the plug member comprises a plurality of flow orifices therein.

37. The valve of claim 1 or claim 22 wherein the plug member is in sliding contact with the interior of the valve chamber.

38. The valve of claim 22 wherein the inlet passage has a cross-sectional flow area defined by a rectangle comprising the leading edge.

39. The valve of claim 14 wherein the valve has a solids flow rangeability of about 64.3.

* * * * *

UNITED STATES PATENT AND TRADEMARK OFFICE
CERTIFICATE OF CORRECTION

PATENT NO. : 5,368,276
DATED : November 29, 1994
INVENTOR(S) : Robert W. Pfeiffer It is certified that error appears in the above-identified patent and that said Letters Patent is hereby corrected as shown below:

In column 2, line 4, delete the period at the end of the line.

In column 3, line 28, replace "particluar" with --particular--.

In column 6, line 4, replace "pressed" with --expressed--.

In column 6, line 64, replace "rangeability," which" with --rangeability", which--.

In column 7, line 47, between "1.45%" and "(0.6/0.8)" replace the comma with an asterisk.

In column 10, line 51, between "base" and "Angles" insert --B. --.

In column 11, line 59, replace "by" with --may--.

In column 12, line 29, delete the comma between "circular" and "arc".

In column 16, line 50, insert --in-- between "defined" and "part".

In column 17, line 55, replace the comma between "X" and "H" with an asterisk.

In column 19, line 28, between "passageway)" and "only" insert --or--.

In column 19, line 39, insert --to-- between "30b" and "flow".

In column 19, line 68, delete the colon.

In column 20, line 6, replace "lin" with --$l_d$ in--.

In column 21, line 61, replace "0" with --O--.

UNITED STATES PATENT AND TRADEMARK OFFICE
CERTIFICATE OF CORRECTION

PATENT NO. : 5,368,276
DATED : November 29, 1994
INVENTOR(S) : Robert W. Pfeiffer It is certified that error appears in the above-identified patent and that said Letters Patent is hereby corrected as shown below:

Column 22, line 63, replace "(if)" with --(ii)--.

Column 23, line 49, replace "isocelese" with --isosceles--.

Column 26, line 32, replace ",," with --,--.

Signed and Sealed this

Twenty-fourth Day of October, 1995

Attest:

BRUCE LEHMAN

*Attesting Officer*  *Commissioner of Patents and Trademarks*